(12) United States Patent
Lee et al.

(10) Patent No.: US 6,484,387 B1
(45) Date of Patent: Nov. 26, 2002

(54) PROGRESSIVE STAMPING DIE ASSEMBLY HAVING TRANSVERSELY MOVABLE DIE STATION AND METHOD OF MANUFACTURING A STACK OF LAMINAE THEREWITH

(75) Inventors: Barry Andrew Lee, Fort Wayne, IN (US); Timothy L. Schrank, Fort Wayne, IN (US)

(73) Assignee: L. H. Carbide Corporation, Fort Wayne, IN (US)

( * ) Notice: Subject to any disclaimer, the term of this patent is extended or adjusted under 35 U.S.C. 154(b) by 338 days.

(21) Appl. No.: 09/589,238

(22) Filed: Jun. 7, 2000

(51) Int. Cl.[7] .............................................. H02K 15/02
(52) U.S. Cl. .............................. 29/596; 29/732; 29/609
(58) Field of Search ........................ 29/596, 732, 609, 29/33 P, 33 Q; 72/336, 339

(56) References Cited

U.S. PATENT DOCUMENTS

| 4,220,062 A | 9/1980 | Blanz |
| 4,532,843 A | 8/1985 | Miyama |
| 4,619,028 A | 10/1986 | Neuenschwander |
| 4,682,524 A | 7/1987 | Achelpohl |
| 4,708,042 A | 11/1987 | Jung |
| 4,738,020 A | 4/1988 | Neuenschwander |
| 5,087,849 A | 2/1992 | Neuenschwander |
| 5,123,155 A | 6/1992 | Neuenschwander |
| 5,193,426 A | 3/1993 | Dunn |
| 5,279,197 A | 1/1994 | Takeda et al. |
| 5,365,816 A | 11/1994 | Rudy |
| 5,604,971 A | * 2/1997 | Steiner ......................... 29/596 |
| 5,755,023 A | * 5/1998 | Neuenschwander .......... 29/596 |
| 5,778,749 A | 7/1998 | Dunn |
| 5,915,750 A | * 6/1999 | Usher et al. ................ 29/564.1 |
| 6,092,278 A | * 7/2000 | Latkow ........................ 29/609 |

FOREIGN PATENT DOCUMENTS

EP    0 738 831 A2    10/1996

* cited by examiner

Primary Examiner—S. Thomas Hughes
Assistant Examiner—Stephen Kenny
(74) Attorney, Agent, or Firm—Baker & Daniels

(57) ABSTRACT

A progressive stamping die assembly apparatus and method in which strip stock material advances in a first direction through the apparatus and substantially simultaneously with the strip stock movement, a transversely moveable die station moves in opposite second and third directions substantially perpendicular to the first direction to one of a plurality of predetermined positions.

19 Claims, 17 Drawing Sheets

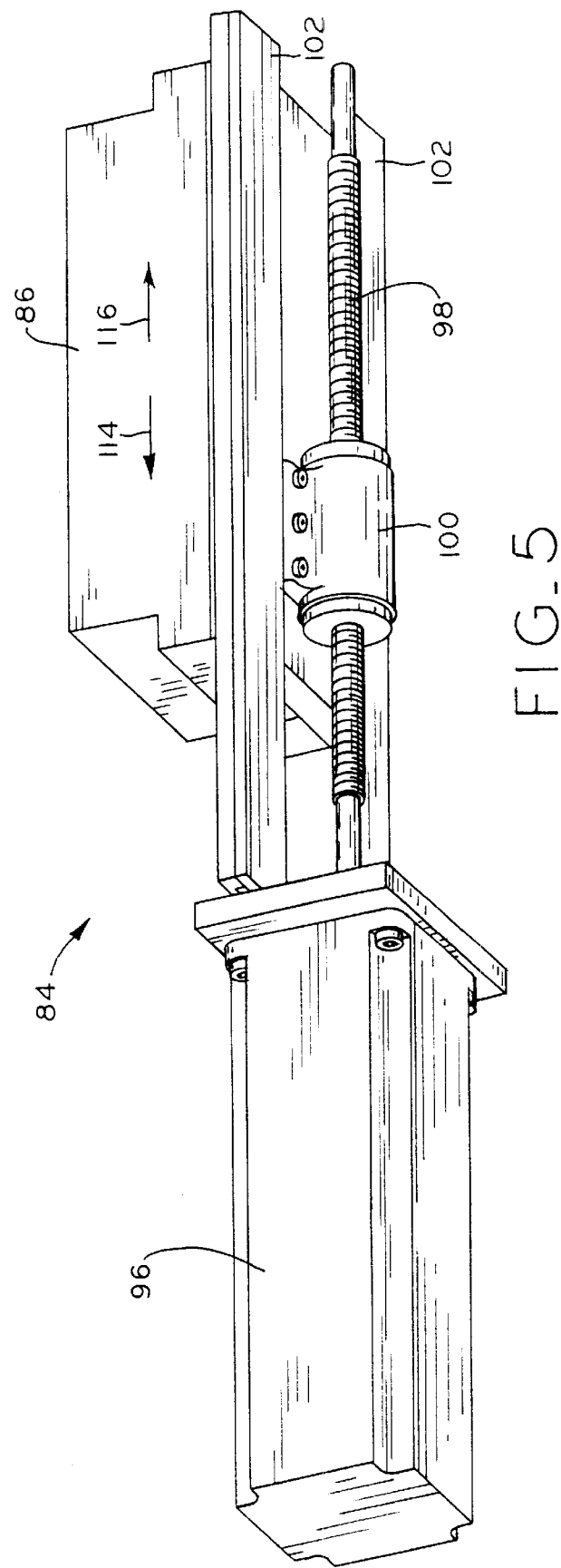

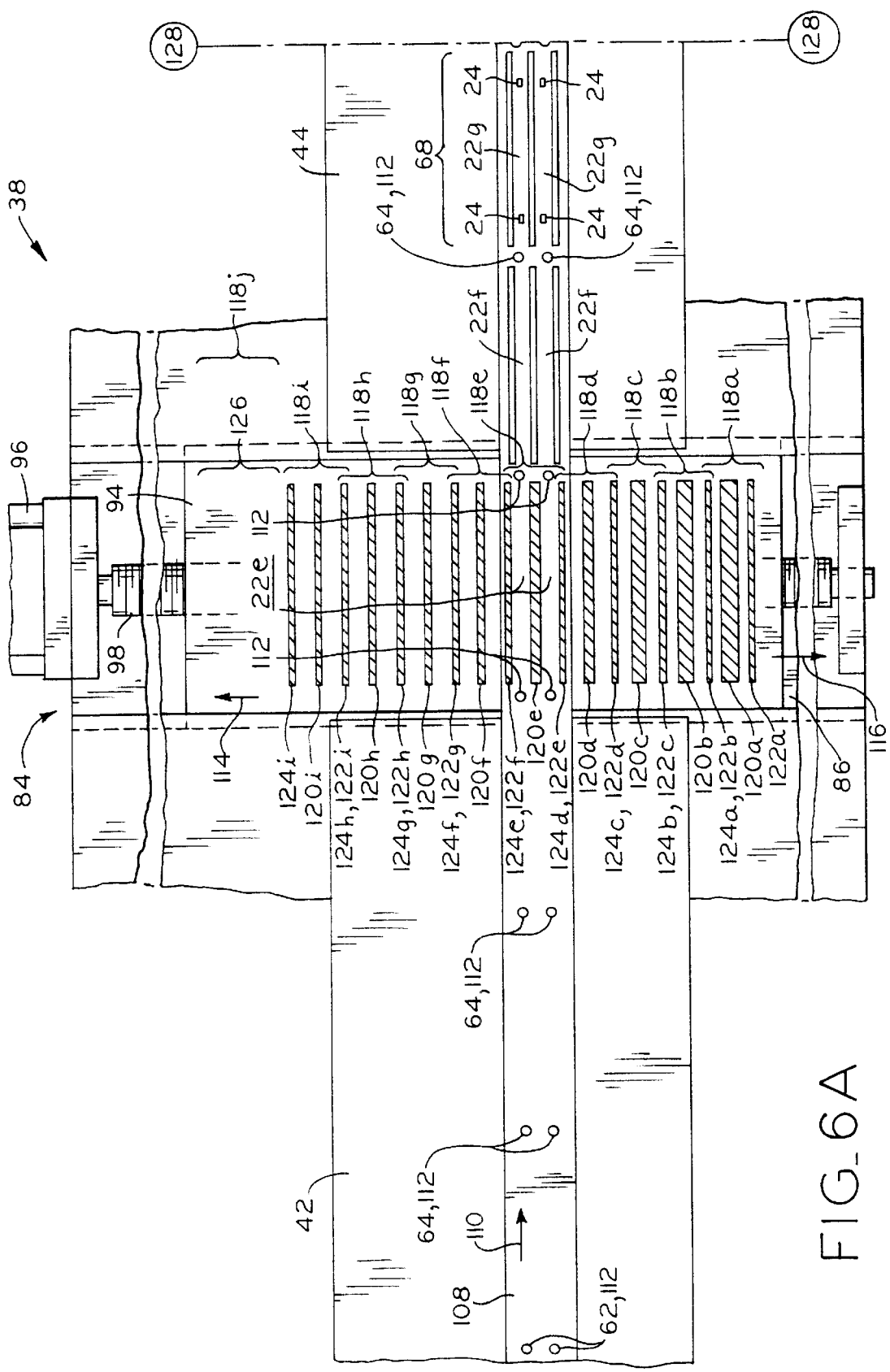
FIG_6A

FIG_10

FIG_11

FIG._12

FIG_13

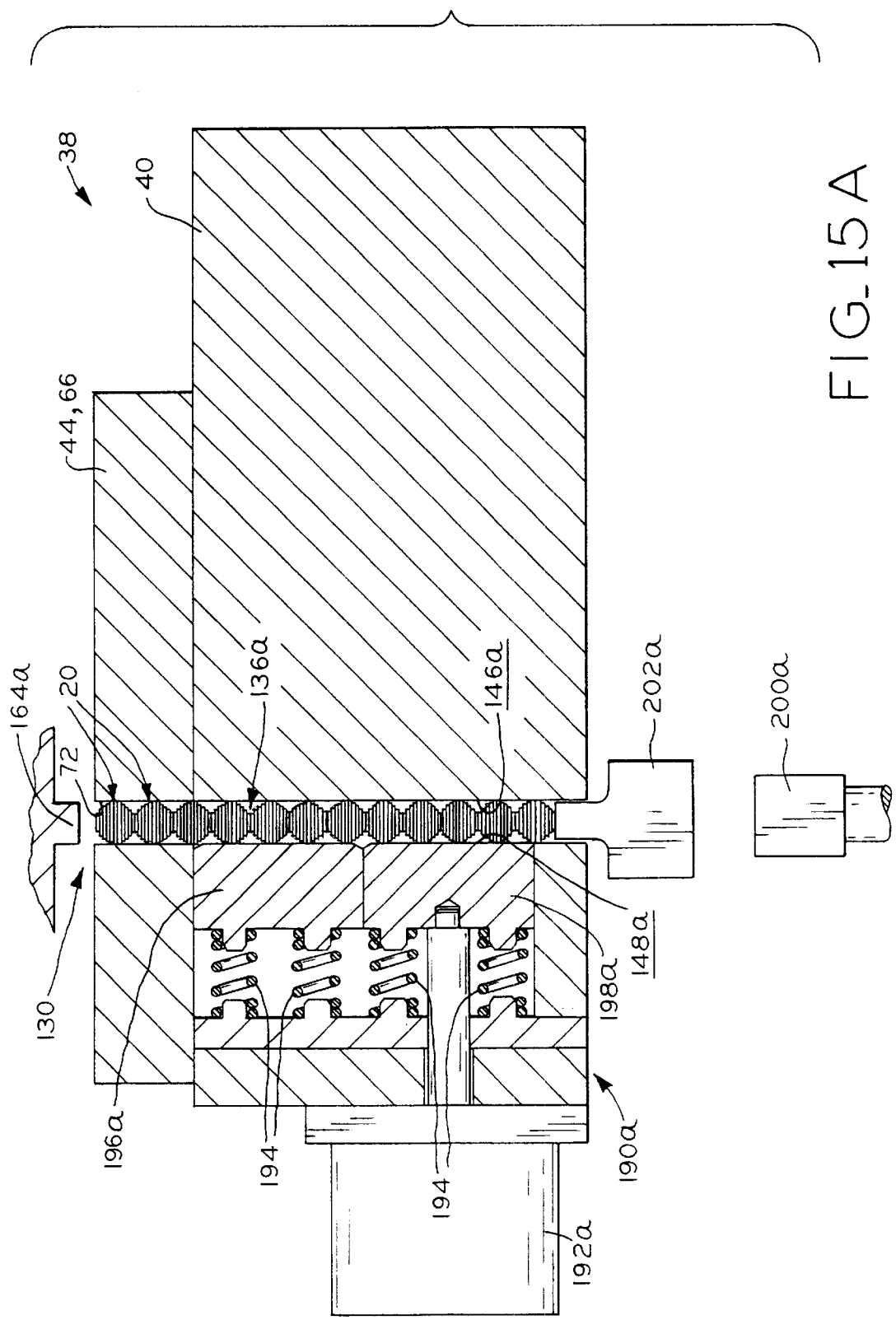

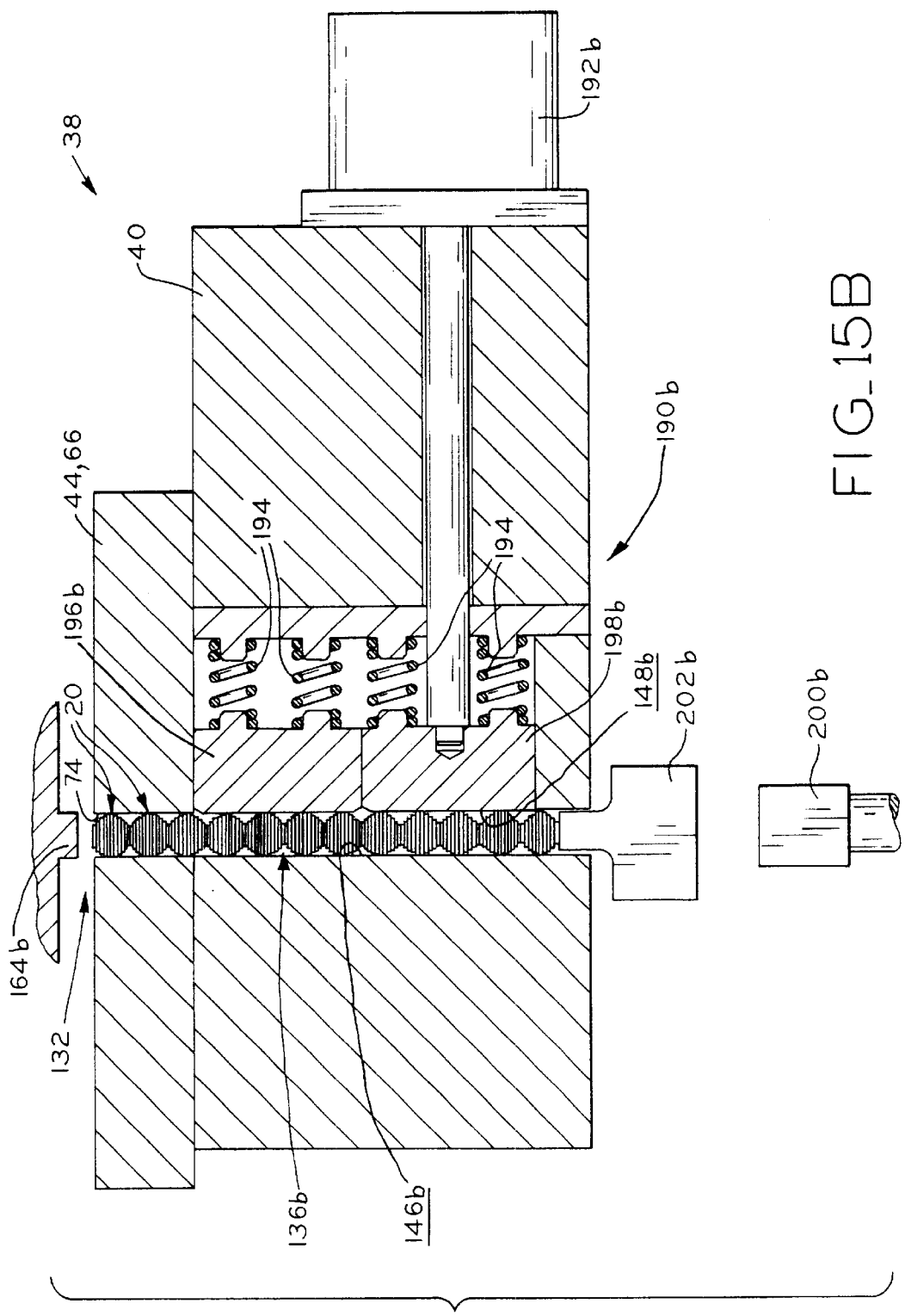

PROGRESSIVE STAMPING DIE ASSEMBLY HAVING TRANSVERSELY MOVABLE DIE STATION AND METHOD OF MANUFACTURING A STACK OF LAMINAE THEREWITH

BACKGROUND OF THE INVENTION

1. Field of the Invention

The present invention relates generally to a progressive stamping die assembly apparatus, and more particularly to such an apparatus for the manufacture of stacks of interlocked laminae.

2. Description of the Related Art

The manufacture of parts comprising a stack of interlocked laminae, e.g., stators and rotors for electric motors, or cylindrical cores for ignition system coils such as those used in low voltage ignition systems having spark plug-mounted coils, is known in the art. Apparatuses and methods associated with such manufacture are disclosed, for example, in U.S. Pat. No. 5,755,023 and Pending U.S. patent application Ser. No. 09/152,979, filed Sep. 14, 1998, which are assigned to the present assignee, and the disclosures of which are expressly incorporated herein by reference. Prior art progressive stamping die assemblies in which a plurality of differently shaped laminae are formed from a common piece of strip stock material, which laminae are stacked to form the laminated part, provide a separate stamping die station for each punch and die which forms a lamina having a particular shape and/or size.

In certain applications it is desirable to have a stack of interlocked laminae which is long and slender, and which has a cross-sectional shape having lateral sides defined by the lamina outer edges which do not lie in a substantially common plane; such a stack does not provide a choke-engaging surface which extends substantially along the vertical height of the stack. For example, it is desirable to have an elongate, substantially cylindrically-shaped lamina stack, in which the first, bottommost lamina is narrower than the adjacent, overlying second lamina, which is narrower than the adjacent, overlying third lamina, and so on, with the middlemost lamina(e) defining the widest portion of the substantially circular cross section and subsequent adjacent, overlying laminae each having a reduced width as compared to its adjacent lamina, thus forming a circular cross section, with each of the laminae of the cylindrically-shaped stack interconnected. Notably, the stock material from which a lamina stack may be produced according to the present invention is thin, and the individual laminae stamped therefrom quite flexible. Because the individual laminae of such a stack are long, thin and flexible, and may also not have common choke-engaging edges, the individual laminae tend to inadequately support the stack in the choke opening, rendering the above-described automatic interlocking method unusable for manufacturing such stacks.

It is known to form interlock tabs in the laminae which extend below the generally planar lamina surface. As the laminae of a stack is added to the stack, in the choke passageway located at the blanking station of the die assembly, each interlock tab engages a corresponding slot in the next lower lamina of the stack, generally by the entire thickness of the tab. The choke passageway may contain a plurality of individual laminated parts, themselves stacked upon each other. The bottom lamina of a stack may have the interlock tabs blanked and removed to avoid interlocking the bottom lamina with the next lower lamina which forms the top lamina of the previous stack. The choke passageway is typically configured to generally match the outer perimeter of at least one (i.e., the widest) of the blanked laminae in a stack and may be slightly undersized relative to that at least one lamina, e.g., by 0.001 inch, so that the laminae will be firmly held and accurately positioned within the choke passageway or barrel. The laminae, after they are located in the choke passageway with an interference fit thereby provide backpressure or resistance which facilitates the entry of the interlock tabs of the next lamina when it is pressed into the choke passageway.

These die stations are generally arranged linearly along a die bed of fixed length. Introducing additional die stations into the bed may thus not be easily facilitated. Further, where great variation in lamination shape and/or size is desired, the required length of prior die assembly apparatuses may be substantial, thereby requiring a large facility to accommodate the apparatus.

What is needed is an apparatus and method for producing long, slender, interlocked stacks of flexible laminae in which the laminae are automatically stamped, stacked and interlocked, the stacks having cross-sectional shapes with side surfaces defined by the side edges of the laminae which may or may not commonly engage the adjacent choke surfaces.

SUMMARY OF THE INVENTION

The present invention provides a method of manufacturing a stack of laminae in a progressive stamping die assembly having a choke passageway, means for guiding strip stock material through the die assembly in a first direction, and a transversely moveable die station which is moveable in opposite second and third directions substantially perpendicular to the first direction and having a plurality of predetermined positions. The method includes the steps of: stamping a first lamina having a first shape in the strip stock material in the transversely moveable die station while the transversely moveable die station is in a first predetermined position; substantially simultaneously advancing the strip stock material through the die assembly in the first direction and moving the transversely moveable die station in one of the second and third directions to a second predetermined position; stamping a second lamina having a second shape in the strip stock material in the transversely moveable die station while the transversely moveable die station is in the second predetermined position, the second shape different than the first shape; separating the first lamina from the strip stock material; placing the first lamina into the choke passageway; separating the second lamina from the strip stock material subsequently to placing the first lamina into the choke passageway; placing the second lamina into the choke passageway; and frictionally engaging the choke passageway with at least one of the first and second laminae.

The present invention also provides a progressive stamping die assembly apparatus for manufacturing a stack of laminae from strip stock material, the apparatus including means for incrementally advancing strip stock material through the die assembly apparatus in a first direction, and a transversely moveable die station comprising a plurality of matched punch and die hole sets arranged along opposite second and third directions, the second and third directions substantially perpendicular to the first direction. The transversely moveable die station has a plurality of preselected positions along the second and third directions, a different one of the plurality of matched punch and die hole sets interfaced with the strip stock material in each of the preselected transversely moveable die station positions. Different ones of the preselected transversely moveable die station positions are assumed by the transversely moveable die station substantially simultaneously with the strip stock material assuming an incrementally advanced position in the first direction through the die assembly apparatus.

An advantage of the present invention is that it provides the ability to easily introduce stamping variations without adding to the length of the apparatus.

Another advantage of the present invention is that it provides a shorter apparatus vis-a-vis previous apparatuses which produce similar laminated parts, thereby facilitating attendant facility requirement reductions.

Yet another advantage of the present invention is that, in addition to providing improved ability to introduce stamping variations without adding to the length of the apparatus, indeed, while providing a shorter apparatus, it is comparable in speed to previous progressive stamping die assembly apparatuses. The apparatus of the present invention can achieve 300 to 350 punch strokes per minute while presenting different die tools to the strip stock material between strokes.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5 is an underside perspective view of the carriage of the apparatus of FIG. 3;

FIGS. 6A and 6B are a fragmentary plan view of the apparatus of FIG. 4, showing strip stock material, and cross hatched punches associated with their respective dies;

FIG. 15A is a cross sectional view of the die assembly at one blanking station of FIG. 6B along 15A—15A, showing a first embodiment of an alternative choke passageway which may be incorporated thereinto;

FIG. 15B is a cross sectional view of the die assembly at the other blanking station of FIG. 6B along line 15B—15B.

Figure 1:
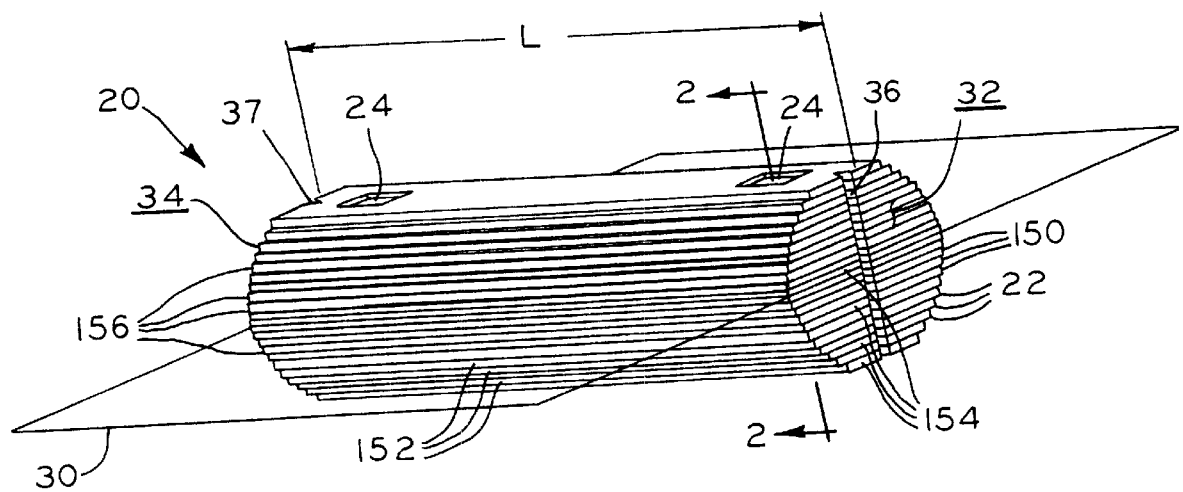
FIG. 1 is a perspective view of one embodiment of a laminated part which may be produced by the inventive progressive stamping die assembly apparatus or in accordance with the inventive method.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description.

Figure 2:
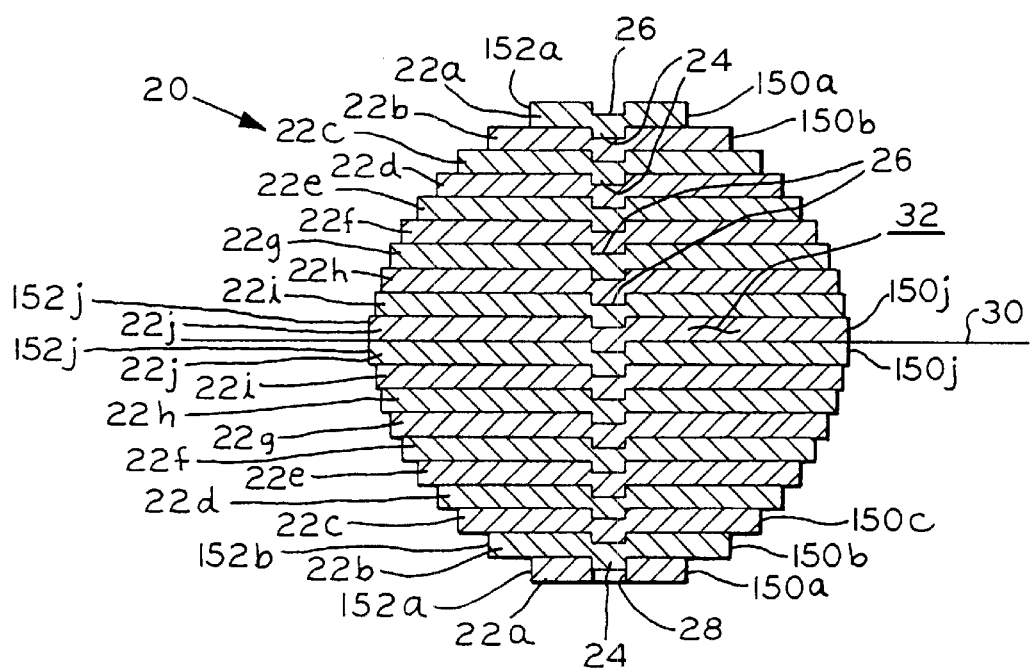
FIG. 2 is a cross-sectional view of the laminated part of FIG. 1, along line 2—2.

FIGS. 1 and 2 illustrate one embodiment of a laminated part which may be produced by the inventive progressive stamping die apparatus inventive method described further herein below. Part 20, which may also be referred to as a "pencil core", comprises a stack of interlocked laminae which is generally cylindrical; each of the plurality of laminae 22 having a common length L. Laminae 22 are interlocked by means of intermitted tabs 24 and recesses 26 formed on and in all but the bottommost lamina. Tabs 24 of one lamina 22 are received in recesses 26 of the adjacent lamina as shown in FIG. 2. The bottommost lamina in the stack is provided with holes 28 into which tabs 24 of the overlying lamina of the stack are engaged. Further, FIG. 2 shows that part 20 is symmetrical about plane 30 and that it has, at its vertical center, two widest laminae which are located on opposite sides of plane 30. The lateral sides of these two widest laminae 22, and axial end surfaces 32, 34 frictionally engage a choke passageway in the apparatus as described further herein below. Although cylindrical part 20 comprises two widest laminae 22 having side edges which frictionally engage the adjacent choke surfaces, it is envisioned that other long, slender parts which may be produced by the inventive apparatus or method may comprise only a single lamina of greatest width, the side edges of which engage the adjacent choke surfaces. Further it is envisioned that the widest lamina(e) need not be vertically middlemost in the stack, as they are in part 20. Indeed, the widest lamina(e) may be anywhere in the stack and, if a plurality of widest laminae are included, they need not be adjacent to one another.

Although part 20 is generally cylindrical, it is to be understood that this part configuration is but one possible embodiment of a stack produced according to the apparatus and method of the present invention; other apparatuses and methods which produce laminated parts having other shapes, but which employ the inventive features disclosed hereinbelow, are to be considered within the scope of the present invention.

Notably, the individual laminae 22 of part 20 are stamped from strip stock material such that length L of each lamina lies along the grain of the material, which substantially lies along the length of the strip stock material. This stamping orientation provides each lamina 22, and thus part 20, with magnetic properties which differ from what would result if the laminae were stamped from the strip stock material such that the length of each lamina lies across the grain of the material, i.e., across the strip stock material width. The orientation of the strip stock material grain relative to the length of part 20 may be an important consideration, depending on the application for which the part is used. Further, each lamina in stack 20 may be made of steel and may or may not be coated with a dielectric material. As shown in FIG. 1, axial end faces 32 and 34 of part 20 are respectively provided with notched grooves 36 and 37 which extend along the directions normal to plane 30; each lamina provided with notches which form the grooves. As illustrated, the aligned notches forming groove 34 and 36 have a triangular shape, but may be of another shape (e.g., rectangular or semicircular) suitable to help maintain the correct position of the lamina or the stack within the choke passageway as described further herein below.

Further, although part 20 comprises laminae which are interlocked to one another within the apparatus, those skilled in the art will appreciate that the method and apparatus for its manufacture herein described may be adapted to produce a stack of laminae which are not interlocked by means of tabs 24 received in recesses 26 or holes 28. Rather, the individual laminae may not include such tabs, recesses and/or holes, and may be attached to one another to form a laminated part by means of, for example, bonding, gluing or welding in a manner known in the art.

Figure 3:
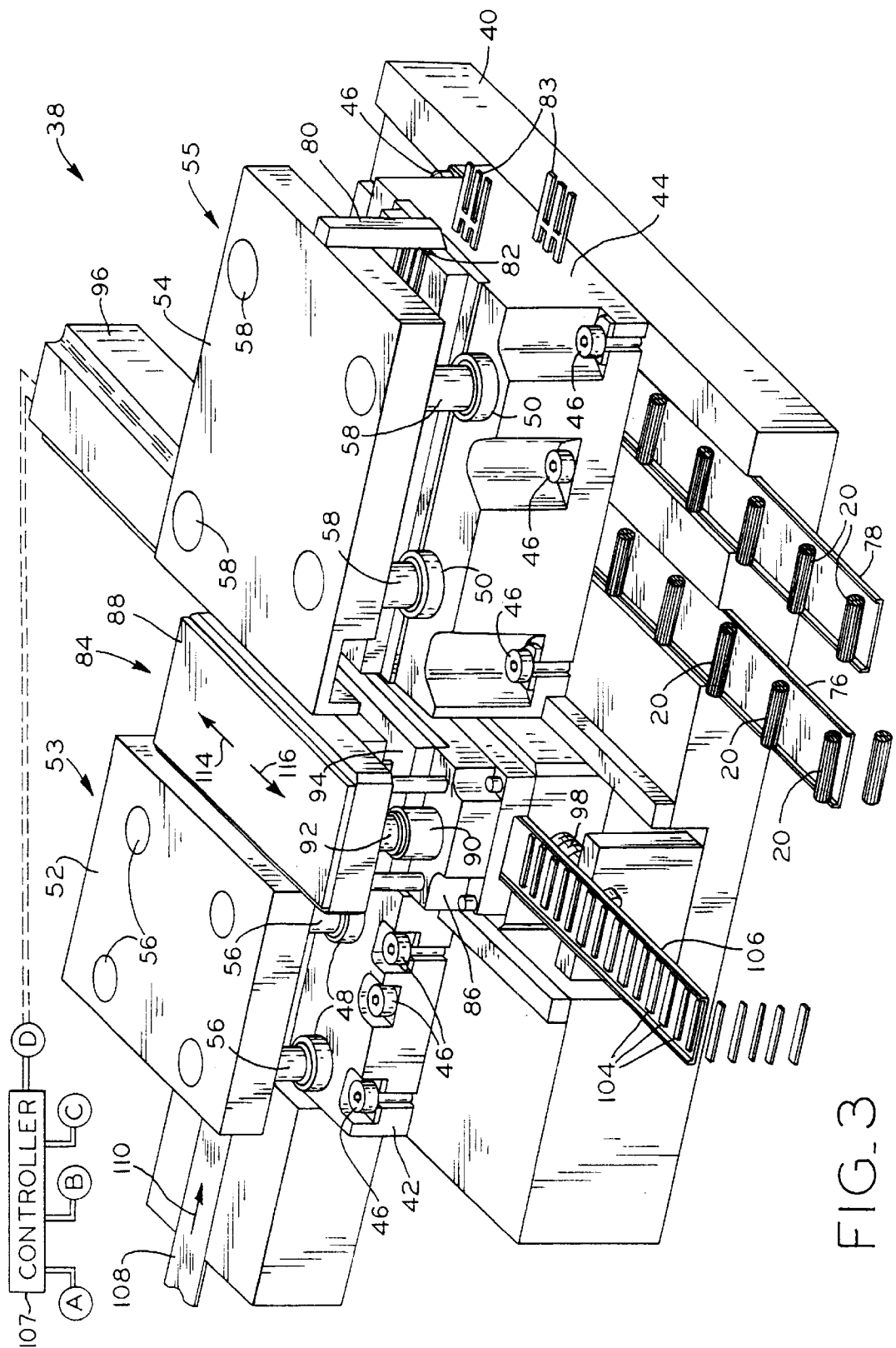
FIG. 3 is a perspective view of one embodiment of a progressive stamping die assembly apparatus according to the present invention.
Figure 4:
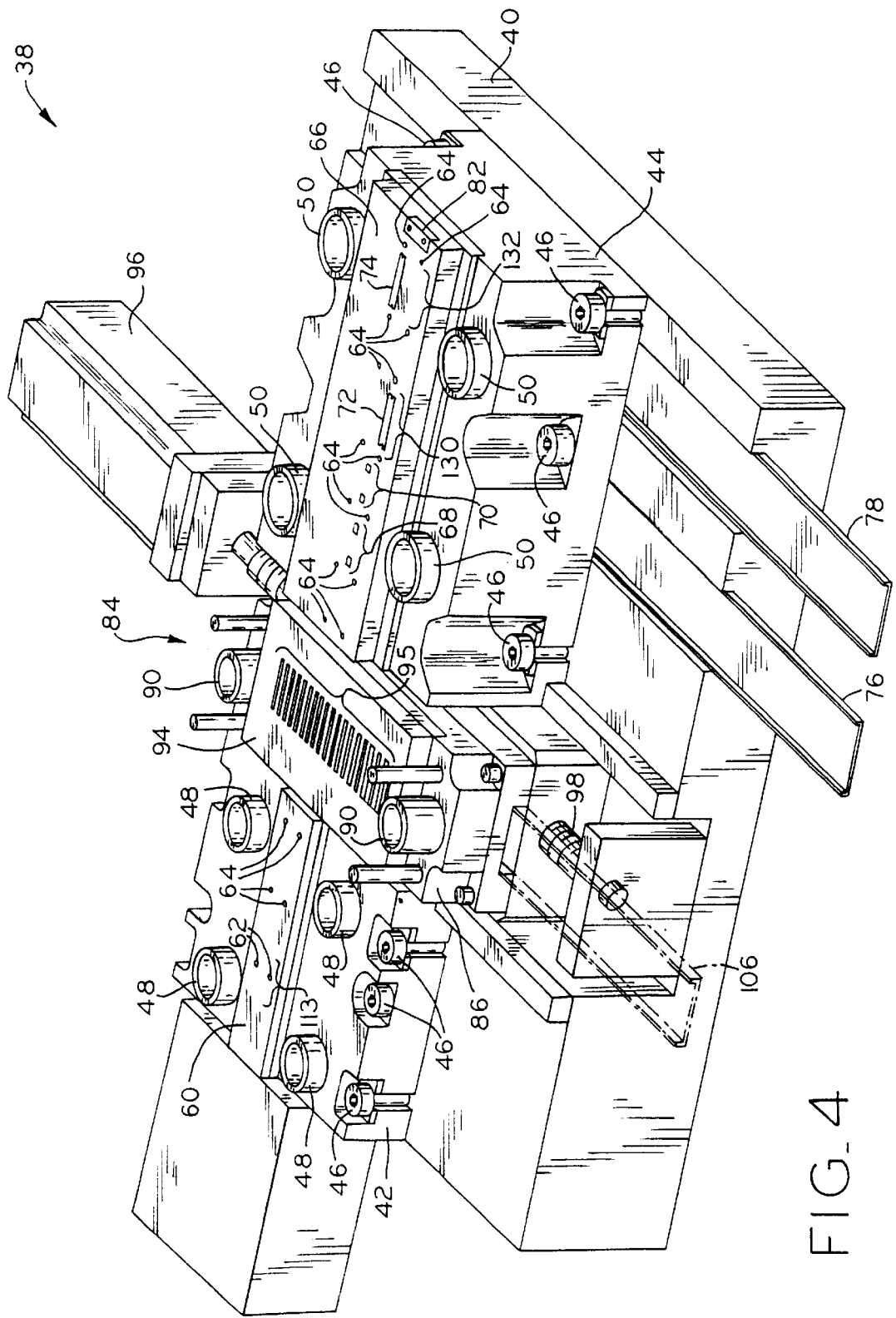
FIG. 4 is a perspective view of the apparatus of FIG. 3, with the upper die portions removed.

Referring now to FIGS. 3 and 4, there is shown progressive stamping die assembly apparatus 38. according to one embodiment of the present invention. Apparatus 38 comprises rigid die bed 40 to which first lower die portion 42 and second lower die portion 44 are attached by means of bolts 46. First lower die portion 42 is provided with recesses having collars 48, and second lower die portion 44 includes recesses having collars 50. The recesses and collars form guide bushings which engage guide rods 56, 58 respectively fixed to first upper die portion 52 and second upper die portion 54. The alignments between the upper and lower die portions are maintained by guide rods 56 and 58, as shown, which are slidably received in the guide bushings. Ball bearing cages (not shown) encircle each guide rod and are disposed within the recesses, and have a slight interference fit between the guide rods and the guide bushings. The ball bearing cages are suspended from the guide rods and remain with the upper die portions when they are pulled away from the lower die portions.

In the manner well-known in the art, the upper die portions are cyclically moved downward, toward the lower die portions, and upward, away from the lower die portions, by means which include a rotating, double eccentric crank (not shown) which drives the slide or ram of the press.

First lower die portion 42 includes die plate 60 in which are located die holes 62 which engage, with each cycle, or stroke, of the press, mating punches (not shown) attached to upper die portion 52. Die plate 60 also includes pilot pin bores 64 which slidably engage, with each cycle of the press, pilot pins (not shown) which depend from first upper die portion 52. Similarly, die plate 66 of second lower die portion 44 includes pilot pin bores 64 which slidably engage, with each punch cycle, pilot pins which depend from second upper die portion 54.

Further, second lower and upper die portions 44 and 54 are provided with die stations 68 and 70 at which tabs 24 and holes 28 are respectively formed in the laminae as described further hereinbelow. Die plate 66 includes blanking die holes 72 and 74 which define the opening of the two separate choke passageways within which parts 20 are formed. As shown in FIG. 3, the individual parts 20, once completed, are received from apparatus 38 via chutes 76 and 78 which are attached to die bed 40 and extend beneath second lower die portion 44 and the choke passageways.

Second upper die portion 54 is provided with blanking punches which engage blanking die holes 72, 74 with each cycle of the press, as will be described further hereinbelow. Further, second upper die portion 54 is provided with shear blade 80 which slidably engages, with each cycle of the press, shear die 82, which is attached to die plate 66. As second upper die portion 54 cycles relative to second lower die portion 44, strip stock material having been fed through apparatus 38 is engaged by the shear to chop the scrap material up into small, easily disposable pieces 83.

From the foregoing, it can be clearly understood that first mating die portions 42 and 52, referred to hereinbelow as first die assembly 53 (FIG. 3), and second mating die portions 44 and 54, referred to hereinbelow as second die assembly 55 (FIG. 3), are horizontally fixed relative to die bed 40, and that the locations of their respective die stations do not move. Intermediate first and second die assemblies 53 and 55 is transversely movable die station 84 which is comprised of lower die portion 86 and overlying upper die portion 88. In the manner described above, lower die portion 86 is provided with recesses having collars 90, forming guide bushings, and upper die portion 88 is provided with relatively fixed guide rods which slidably engage the guide bushings through ball bearing cages to maintain proper alignment of the upper and lower die portions. Lower die portion 86 includes die plate 94 comprising a plurality of die holes 95, and upper die portion 88 includes a plurality of punches which engage die holes 95 as a group with each cycle of the press.

Those skilled in the art will appreciate that a common press may be used to cycle upper die portions 52, 54 and 88. Alternatively, individual presses may be provided for actuating these upper die portions, but it is envisioned that such individual presses will cycle substantially simultaneously. Further, it should be noted that second upper die portion 54 may be provided with a cam mechanism (not shown) by which die station 68 or 70 may be selectively actuated, such that the holes 28 are provided only in the bottommost lamina of a part 20 at die station 70, each of the other lamina in a part 20 being provided with tabs 24 and recesses 26 at die station 68.

With each punch cycle, a number of blanks 104 may be removed from the strip stock material as the material passes through moveable die station 84. These blanks are removed from apparatus 38 via chute 106 which is attached to lower die portion 86.

Movable die station 84 is controllably moved transversely to the direction of strip stock material advancement by means of servomotor 96, best shown in FIG. 5. Simultaneously with the incremental advancement of strip stock material through the apparatus, the servomotor rotates drive screw 98 in one direction or the other. The external thread of screw 98 is engaged with the internally threaded portion of carriage 100. Carriage 100 is attached to the underside of lower die portion 86, which slides along ways or runners 102 disposed between rigid die bed 40 and lower die portion 86. The mating threads of screw 98 and carriage 100 are of high precision, and in conjunction with the precisely controlled rotation of the screw, provide very fine control over the transverse position of die station 84 relative to the strip stock material. Die station 84 assumes its new position substantially simultaneously with the strip stock material assuming an incrementally advanced position in the first direction.

Basically, there are four functions (A, B, C and D) which are coordinated in operation of the inventive die stamping apparatus: (A) the rate and positioning of the strip stock material as it is fed through apparatus 38; (B) the cycling rate of the press(es); (C) if the apparatus is so configured, the actuation of the cam which selectively alternates between die stations 68 and 70 (FIG. 4); and (D) the rotation of screw 98 by servomotor 96. These four functions may be controlled by a single controller 107 (FIG. 3).

Alternatively, in lieu of a single controller 107, functions A and B may be controlled by a first, known, separate and dedicated punch press controller (not shown) as provided by the various punch press manufacturers; and functions C and D may be controlled by a second, separate controller (not shown) which is coordinated with the punch press controller. The second controller is fully programmable with respect to the servo motion profile governing the action of the transversely moveable die station and all cammed operations of the apparatus. Further, the second controller permits production of any and all widths of laminae for which tooling is present, in any order, and in any multiple. Moreover, the second controller can also control and coordinate more than one transversely moveable die station, and in that case lamina stacks can be sized and configured independently; i.e., the parts assembled in the choke associated with blanking die hole 72 (FIG. 4) may not be identical to the parts assembled in the choke associated with blanking die hole 74.

The functions of the separate first and second controllers may be similar to those of controllers 72 and 190 described in U.S. Pat. No. 4,619,028, issued Oct. 28, 1986; U.S. Pat. No. 4,738,020 issued Apr. 19, 1988; U.S. Pat. No. 5,087,849 issued Feb. 11, 1992; and U.S. Pat. No. 5,123,155 issued Jun. 23, 1992, the disclosures of which are each expressly incorporated herein by reference. Indeed, these first and second controllers may be based on referenced controllers 72 and 190. A thickness measurement of the incoming strip stock material may also be performed, and the second controller is capable of increasing or decreasing the number of laminae in the stack in response to changes in stock material thickness, thereby providing a means of ensuring a finished part of consistent exterior dimensions, rather than of a particular number of laminae, if desired.

Moreover, it is envisioned that single controller 107, or the second controller of the above-described alternative control means, may also control a backpressure and unload device operatively communicating with each of the choke passageways. Such a device is described further hereinbelow, with reference to FIGS. 15A–C.

Notably, a stepper motor (not shown) having appropriately defined angular steps may be substituted for servomotor 96 and its attendant feedback system, a means of control common to servomotors. A servomotor system, however, provides greater flexibility vis-a-vis a more powerful and precise stepper motor, and can more easily accommodate changes to part 20 or provide the ability to run parts of various designs through apparatus 38 by merely revising its controlling program. It is envisioned that any such changes to the part or the running of parts having various designs may require a stepper motor having windings which provide a different step angle specification.

As discussed further herein below, the distances die station 84 travels between its successive positions varies. The rate of movement of die station 84 from one of its preselected positions to a different one of its preselected positions may be controlled in response to the steady, controlled incremental movement of the strip stock material in the first direction. Die station 84 and strip stock material 108 should simultaneously assume their respective new predetermined positions to maintain smooth operation of apparatus 38 and a constant part production rate. Apparatus 38 may operate a speeds of approximately 300 to 350 press cycles per second and, with each part 20 comprising 20 laminae, and two parts 20 being produced simultaneously, approximately 35 completed parts per minute can be produced by apparatus 38. Moreover, those skilled in the art will appreciate that the repositioning of the variously sized punches and their respectively mating die holes about strip stock material 108 in die station 84 is done "on the fly" as the strip stock material continuously and intermittently advances through apparatus 38. Movement of strip stock material 108 pausing, or "dwelling", only during the portion of each press cycle in which the strip stock material is engaged by a pilot pin or punch. Similarly, transverse movement of die station 84 will normally dwell only during those periods, unless two sequentially identical and longitudinally adjacent laminae are being processed through die station 84, such as, for example, with reference to FIG. 2, two endmost laminae 22a or two middlemost laminae 22j, described further hereinbelow. That is, die station 84 may remain transversely stationary for longer than one press cycle while two sequentially identical and longitudinally adjacent laminae are being processed therethrough, but would otherwise remain transversely stationary only for so long as necessary to allow its punches to engage the material. The incremental advancement of strip stock material through apparatus 104 is thus substantially smooth and continuous, and there is no appreciable interruption of the stamping process to introduce new punch and die hole sets into the stamping process at the transversely moveable die station, the movements of die station 84 and the strip stock material being very rapid and closely coordinated.

Strip stock material 108 is fed through apparatus 38 by known feeder roll means (not shown) along the first direction indicated by arrow 110. Pilot holes 112 are formed in material 108 at die station 113 (FIG. 4) comprising die holes 62 and their mating punches. The pilot pins associated with upper die portions 52, 54 engage the strip stock material through pilot holes 112 and extend therethrough into pilot pin bores 64 provided in the respective die plates 60, 66 on which the strip stock material slides. As shown in FIG. 6A, transversely movable die station 84 moves in opposed second and third directions indicated by arrows 114 and 116, respectively, the second and third directions being perpendicular to the first direction indicated by arrow 110.

As strip stock material 108 advances through apparatus 38, that portion of the strip stock material which lies between upper and lower die portions 86, 88 of die station 84 may be engaged by one of the plurality of matched punches and die holes 95 or, as described below, pass through die station 84 without being punched. As one of the plurality of matched punch and die sets engages the strip stock material, blanks 104 are removed from material 108, resulting in elongate lamina portions having variable widths between first and second longitudinally extending edges 150, 152 being left in the strip stock material as it continues through apparatus 38 from die station 84.

Simultaneously with the advancement of material 108 through apparatus 38, die station 84 advances in the direction of arrows 114 or 116, adjusting to another one of its plurality of predetermined positions about strip stock material 108 to produce the desired lamina portion width characteristics in the material. As shown, each respective set 118*a–i* of matched punches and die holes in die station 84 comprises three (3) pairs of mating punches and die holes. Set 118*a* includes center punch/die hole pair 120*a*, first outlying punch/die hole pair 122*a* and second outlying punch/die hole pair 124*a*. The distance between a center punch/die hole pair and each of its two respective outlying punch/die hole pairs defines the widths of two laminae, but not the widest laminae, in part 20. Referring again to FIG. 2, these two laminae will be equidistant from plane 30. Further, it is to be understood that lamina portions for two separate parts 20 are simultaneously formed side-by-side in material 108, and that a lamina portion formed between a center punch/die hole pair 120 and its first outlying punch/die hole pair 122 is included in a part 20 which is stacked in the choke passageway having its opening defined by blanking die hole 72, whereas a lamina portion formed between a center punch/die hole pair 120 and its second outlying punch/die hole pair 124 is included in a part 20 which is stacked in the choke passageway having its opening defined by blanking die hole 74. Those skilled in the art will recognize that with attendant revisions to apparatus 38 and the width of the strip stock material, the number of parts which may be simultaneously produced may be more or less than two as described herein.

Moreover, an outlying punch/die hole pair 122 or 124 is shared between adjacent punch and die hole sets 118, i.e., the first outlying punch/die hole pair of one punch and die hole set 118 comprises the second outlying punch/die hole pair of the adjacent set 118. For example, with reference to FIG. 6A, second outlying punch/die hole pair 124*a* of set 118*a* also serves as first outlying punch/die hole pair 122*b* of set 118*b*. This sharing of outlying punch/die hole pairs exists between adjacent punch/die hole sets 118*a* through 118*i*, thereby minimizing the required width of die station 84 and reducing the distance die station must travel as it advances from one set 118 to an adjacent set 118. The quick adjustment of the die station between its various positions thus facilitated, apparatus 38 may operate a speeds of approximately 300 to 350 press cycles per second, as mentioned above. With each part 20 comprising 20 laminae, and two parts 20 being produced simultaneously, approximately 35 completed parts per minute can be produced by apparatus 38.

Figure 6B:
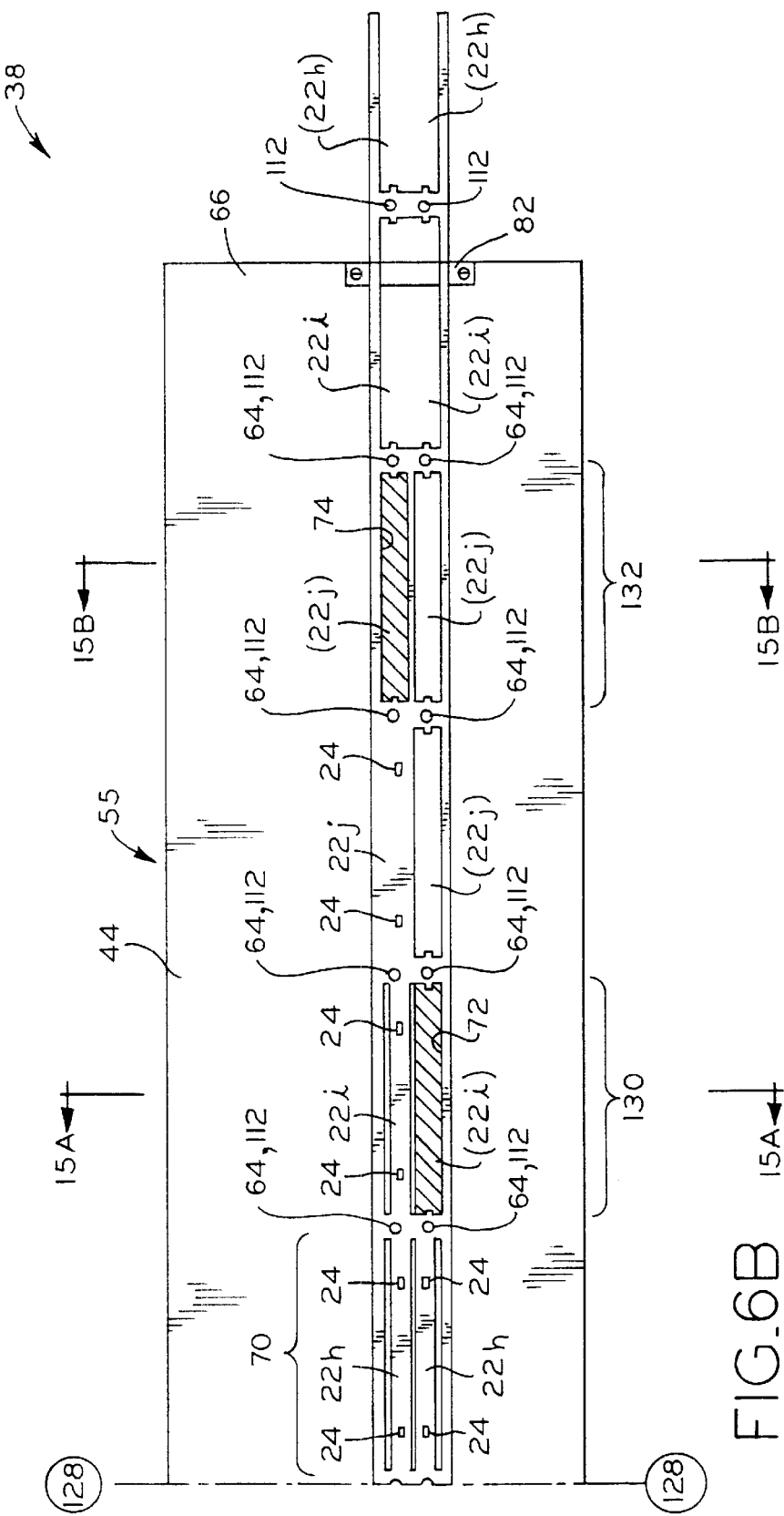

Notably, the widest laminae in part 20 are formed at the blanking die station 130 or 132 in die assembly 55 (FIG. 6B), rather than at die station 84. The lamina portions in strip stock material 108 from which the widest lamina are formed pass through blank portion 126 in die station 84. Although blank portion 126 of die station 84 (FIG. 6B) includes no punches or die holes, if the positioning of this die station about material 108 is considered in the context of the positions of the various, aforementioned punch/die hole sets 118*a–i*, blank portion 126 may be thought of as "punch/die hole set 118*j*" (FIG. 6A). The strip stock material portion which is disposed in die station 84 when set 118*j* is aligned with the material (the "idle position") proceeds through the movable die station without being punched therefrom although the press which engages upper die portion 88 may be cycled as usual.

A normal transverse cycle of die station 84 begins with the cycling of the press(es) to engage strip stock material 108 with punch/die hole set 118*a*, which forms the narrowest side-by-side lamina portions in the material. These narrowest lamina portions comprise the bottommost lamina 22*a* in two parts 20, one of which is shown in FIG. 2. Once all of the lower and upper die portions are separated, at the end of the punch cycle, material 108 incrementally advances such that a pair of its pilot holes 112 are moved from its alignment with one pair of pilot pin bores 64 to an alignment with the next successively encountered pair of pilot pin bores 64. As material 108 so advances, die station 84 is simultaneously moved in the direction of arrow 116 to position punch/die hole set 118*b* over the strip stock material. Relative to moveable die station 84, this process continues, with die station 84 so moved in the direction of arrow 116, until the press(es) have finished a cycle and die station 84 is in its idle position; here, one half of the lamina portions 22 eventually comprising part 20 have been processed through die station 84. At this point, die station has traveled its full distance in the direction of arrow 116.

The press(es) again cycle with die station 84 in its idle position, and as the material is further advanced, die station 84 reverses its initial direction of movement, moving in the direction of arrow 114 to, next dispose punch/die hole set 118*i* about the strip stock material. This process continues, with die station moving in the direction of arrow 114 until the press(es) have finished a cycle with "narrowest lamina" punch/die hole set 118*a* disposed about the strip stock material; here, all of the lamina portions 22 eventually comprising part 20 have been processed through die station 84. At this point, die station has traveled its full distance in the direction of arrow 114 and has completed one full transverse cycle.

FIG. 6B is a continuation of FIG. 6A and the two drawings may be linked together by superimposing lines 128–128 thereof. Referring to linked FIGS. 6A and 6B, with transversely movable die station 84 moving in the direction of arrow 114 (second direction), to the right of die station 84 are successively located lamina portions 22 formed in strip stock material 108 by the respectively associated sets of punch/die holes 118 which had previously engaged the material. Hence, lamina portions 22*e* are shown being formed in die station 84 by punch/die hole set 118*e*; just previously, rightwardly adjacent lamina portions 22*f* were formed by adjacent set 118*f*; prior to that, successively adjacent lamina portions 22*g* (shown now located at die station 68 at which tabs 24 and recesses 26 are formed in the lamina portions) were formed by successively adjacent set 118*g*; prior to that, successively adjacent lamina portions 22*h* (shown now located at die station 70 at which holes 28 are formed in only the widest of the laminae) were formed by successively adjacent set 118*h*; prior to that, successively adjacent lamina portions 22*i* (shown at blanking station 130 at which one of the side-by-side lamina portions is separated from the strip stock material and forced into a choke passageway) were formed by successively adjacent set 118*i* (Here it should be noted that in FIGS. 6A and 6B, parenthesized reference numerals indicating lamina portions 22 along strip stock: material 108 (e.g., "(22*i*)") refer to the former location of that particular lamina portion in the material, prior to being separated therefrom.); prior to that, successively adjacent lamina portions 22j, which will each eventually be one of the two widest laminae in a part 20 (FIG. 2), had passed through die station 84 at its idle position; and prior to that, adjacent lamina portions 22j (shown at blanking station 132 at which the other of the side-by-side lamina portions is separated from the strip stock material and forced into a choke passageway), which will each eventually be the other of the two widest laminae in a part 20, had also passed through die station 84 at its idle position. As mentioned above, the width of these widest laminae 22j are defined at blanking stations 130, 132, and their longitudinal side edges 150j, 152j, along with at least portions of part axial end faces 32, 34 frictionally engage the interior side surfaces of the choke passageways. Downstream of blanking station 132, the strip stock material scrap is chopped by shear parts 80, 82 into easily collected pieces 83 (FIG. 3). The trend detailed above continues as material 108 continues to advance in the direction of arrow 114. Once lamina portions 22a have been provided in the material, and die station 84 has returned to its initial position after completing one full transverse cycle, all the side-by-side lamina portions which eventually comprise two parts 20 have been processed through die station 84. The cycle then repeats without interrupting the advancement of material 108 through apparatus 38, with another side-by-side pair of lamina portions 22a being formed by set 118a—these eventually comprising the bottommost laminae in two parts 20. As mentioned above, these two bottommost lamina portions 22a will later have holes 28 formed in them at die station 70, rather than tabs 24 and recesses 26 at die station 68. Die station then proceeds to move transversely in the direction indicated by arrow 116 as the new cycle continues.

Figure 7:
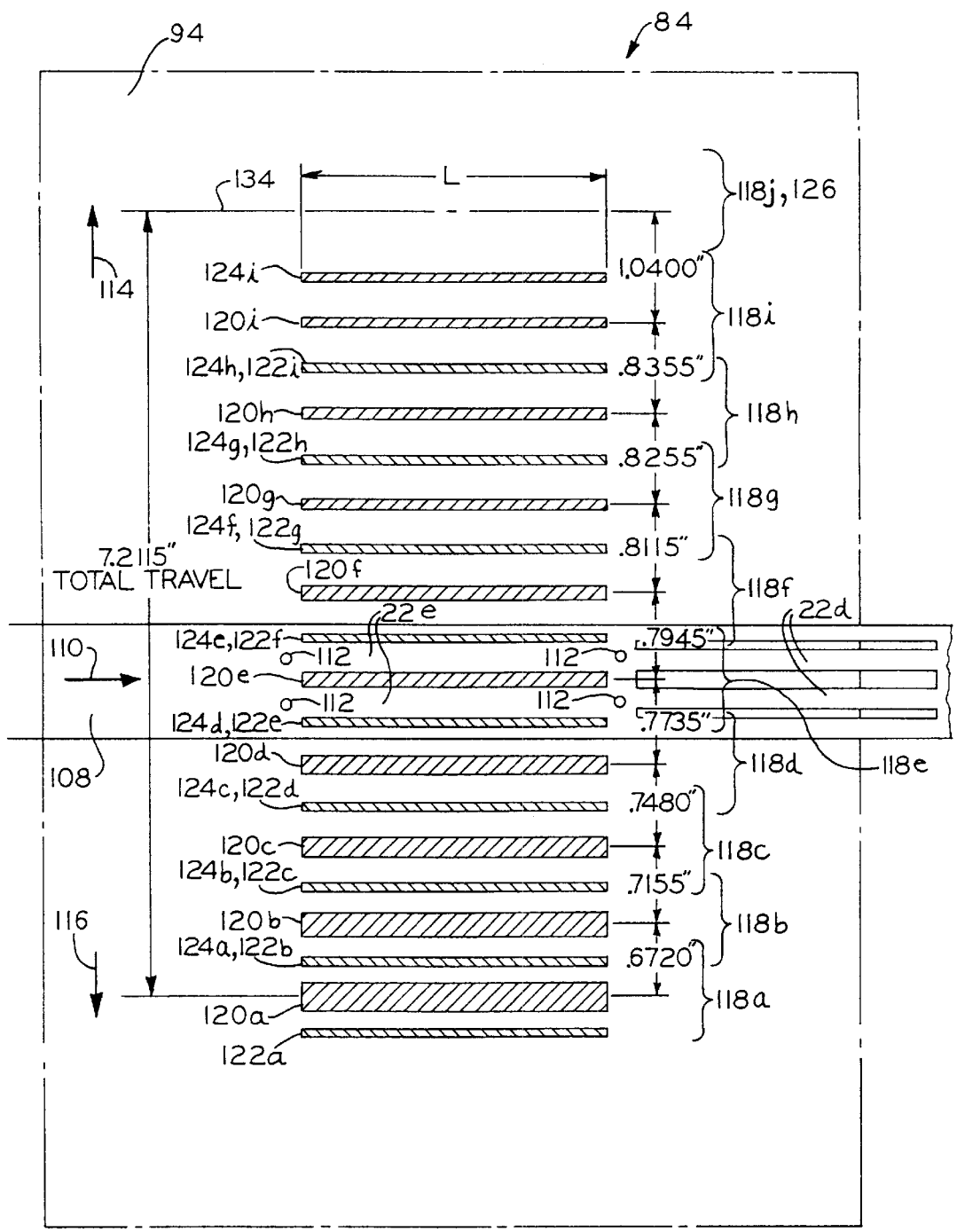
FIG. 7 is an enlarged, fragmentary plan schematic of the apparatus of FIG. 6A.

Referring now to FIG. 7, there is shown a schematic plan view of transversely movable die station 84, which more particularly points out the distances traveled as punch/die hole sets 118 are successively positioned about strip stock material 108. As shown, die assembly 84 moves in the direction of arrow 116. The total distance traveled by die station 84, as it successively positions punch/die hole sets 118a–j about the strip stock material, is 7.2155 inches. Owing to the differences in width of the center punch/die hole pair 120 and the sharing of outlying punch/die hole pairs 122, 124 as described above, the distances traveled to successively position adjacent successive punch/die hole sets 118 about the strip stock material varies. It can be seen from FIG. 7 that in die station 84, along the second or third direction (respectively indicated by arrows 114 and 116), the distance between center punch/die hole pairs 120a and 120b is approximately 0.6720 inches; the distance between center punch/die hole pairs 120b and 120c is approximately 0.7155 inches; the distance between center punch/die hole pairs 120c and 120d is approximately 0.7480 inches; the distance between center punch/die hole pairs 120d and 120e is approximately 0.7735 inches; the distance between center punch/die hole pairs 120e and 120f is approximately 0.7945 inches; the distance between center punch/die hole pairs 120f and 120g is approximately 0.8115 inches; the distance between center punch/die hole pairs 120g and 120h is approximately 0.8250 inches; and the distance between center punch/die hole pairs 120h and 120i is approximately 0.8355 inches. The distance between center punch/die hole pair 120i to center axis 134 of set 118j (i.e., blank portion 126), which axis is aligned with the center of strip stock material 108 when blank portion 126 is disposed thereabout (i.e., the idle position), is approximately 1.0400 inches.

These incremental distances total 7.2155 inches, the maximum distance die station 84 can travel in either the second or the third direction. It is to be understood that the specificity of the distances between punch/die hole pairs is not intended to limit the scope of the present invention in any way. Rather, such specificity is intended to illustrate that the incremental transverse movements of die station 84 between its positions are not necessary equal. Further, it is to be understood that every die placed in station 84 may be different, and that in a given die the sequencing between its various positions need not be sequential and may be easily altered by appropriately altering the program of controller 107.

Figure 8:
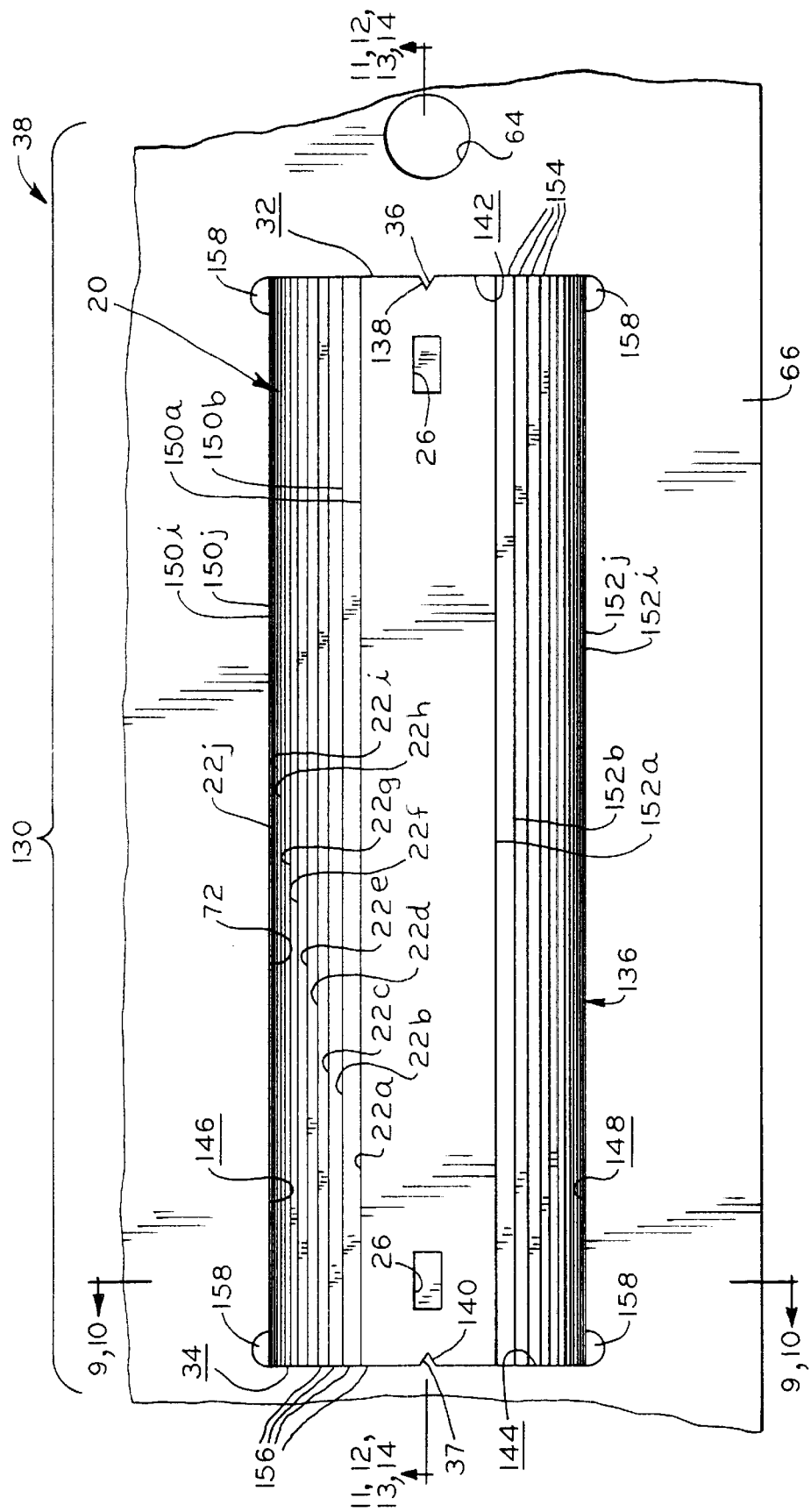
FIG. 8 is a fragmentary plan view of a blanking station of the apparatus of FIG. 6B, showing an stack of interlocked laminae in the choke passageway thereof.

Referring to FIG. 8, at die station 130 all of the lamina portions are blanked from one lateral side of strip stock material 108 which, for purposes of clarity, is not shown in FIG. 8. A finished part 20 is shown in choke passageway 136, the opening of which is defined by blanking die hole 72 in die plate 66. As mentioned above, the engagement of the blanking punch with its mating die hole 72 defines lateral edges 150j, 152j in the widest laminae in part 20; thus, lamina 22j, once fully formed, has a shape and size which matches those of die hole 72. It is to be understood that the preceding description of the structure and operation of blanking die station 130, and that which follows, correspondingly applies to the structure and operation of blanking die station 132 and its associated choke passageway.

As shown in FIG. 8, choke passageway 136 has end alignment surfaces 142, 144 which correspond with and slidably engage each lamina of part 20 at the lamina's opposed third and fourth axial end edges 154, 156, which lie distance L apart and comprise part axial end surfaces 32, 34 (best shown in FIG. 1). To preclude lamina bowing, there may be no appreciable frictional engagement between edges 154, 156 and choke surfaces 142, 144. Choke passageway 136 also has side alignment surfaces 146, 148 which correspond with and frictionally engage side edges 150j, 152j of each widest lamina 22j (best shown in FIG. 2). Alignment surfaces 146, 148 of choke passageway 136 define a choke width therebetween which is equal to or slightly less, e.g., by 0.001 inch total or about 0.0005 inch per side, than the part width defined by side edges 150j, 152j of widest laminae 22j to thereby provide an interference fit engagement with these laminae.

Notably, end edges 154, 156 of at least one lamina of a part precisely hold the longitudinal position of the part in the choke, and there may be only a close clearance between these edges and the respective adjacent surfaces of the choke; frictional engagement therebetween is not necessary.

Further, as the engagement of the blanking punch with its mating die hole 72 severs lamina portions 22 from the strip stock material, the notches which form grooves 36 and 37 in respective axial end faces 32 and 34 of part 20 are simultaneously formed in each lamina 22. Choke passageway 136 is provided with protrusions or ridges 138 and 140, which extend into grooves 36 and 37 to prevent undesirable rotation of part 20 in the choke passageway, thereby helping to ensure the proper angular orientation of the part. The interference fit engagement of each of the laminae, in combination with the engagement of protrusions 138, 140 and grooves 36, 37, maintain the laminae in a properly aligned position within the choke passageway. The interference fit engagement of each of the laminae and the side walls of the choke passageway also resists the movement of the laminae therethrough, which facilitates the pressing of tabs 24 of a subsequently blanked lamina into interlocked engagement with recesses 26 or holes 28 of a lamina already in the choke passageway.

Moreover, the engagement of protrusions 138, 140 and the notches which form grooves 36, 37 ensures that individual laminae 22*a–i*, which have insufficient width between their respective, opposed first and second edges 150*a–i*, 152*a–i* to engage choke passageway side surfaces 146, 148, remain properly positioned laterally in choke passageway 136. The sliding engagement of the notches over protrusions 138, 140 is particularly useful in maintaining the alignment of laminae 22*a–i* which enter the choke passageway before the lowermost of widest laminae 22*j* in a part 20 does. For example, with reference to FIG. 2, in producing a part 20, the engagement of the laminae notches on protrusions 138, 140 ensures that a partial stack of laminae consisting only of bottommost lamina 22*a* up to and including lamina 22*i* (the lamina which is adjacently below lowermost widest lamina 22*j*) remains correctly positioned in choke passageway 136. Otherwise, such a partial stack would depend solely on the frictional engagement of partially formed axial end surfaces 32, 34 with adjacent choke end surfaces 142, 144, respectively, for maintaining its proper orientation in the choke passageway. Further, the engagement of grooves 36, 37 over ridges 138, 140 preclude the possibility of a partially formed or a completed part 20 inadvertently rotating about its longitudinal axis within passageway 136. The lamina notches may frictionally engage ridges 138, 140 or, alternatively, the cross sections of the ridges 138, 140 within the choke passageway may be slightly undersized vis-a-vis those provided in blanking die hole 72, thus providing a slight clearance between the notches and the ridges within the choke passageway below die plate 66. Those skilled in the art will recognize that, conversely, a protrusion may instead be provided in opposite sides of the blanking die, and which will mate to notches provided on opposite ends of die hole 72, these notches extending as grooves in choke end surfaces 142, 144. Hence, protrusions rather than notches would be formed in end edges 154, 156 of each lamina, the lamina protrusions slidably received in the grooves formed in choke passageway 136 in the manner described above, for maintaining proper orientation of the laminae or stacks in the choke passageway.

Figure 9:
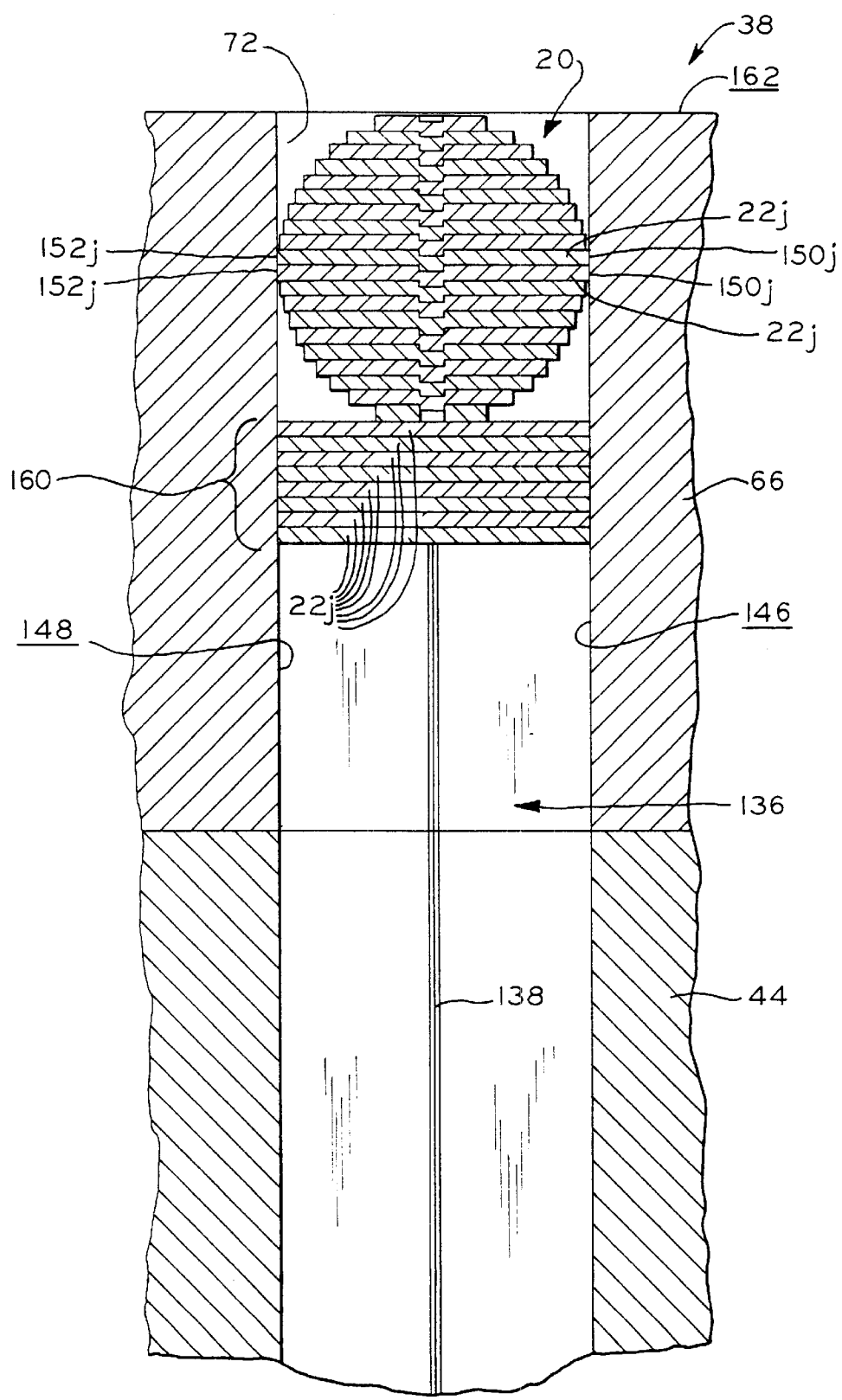
FIG. 9 is a fragmentary sectional end view of the blanking station of FIG. 8, along line 9—9, showing the first-produced interlocked stack of laminae in the choke passageway thereof.
Figure 10:
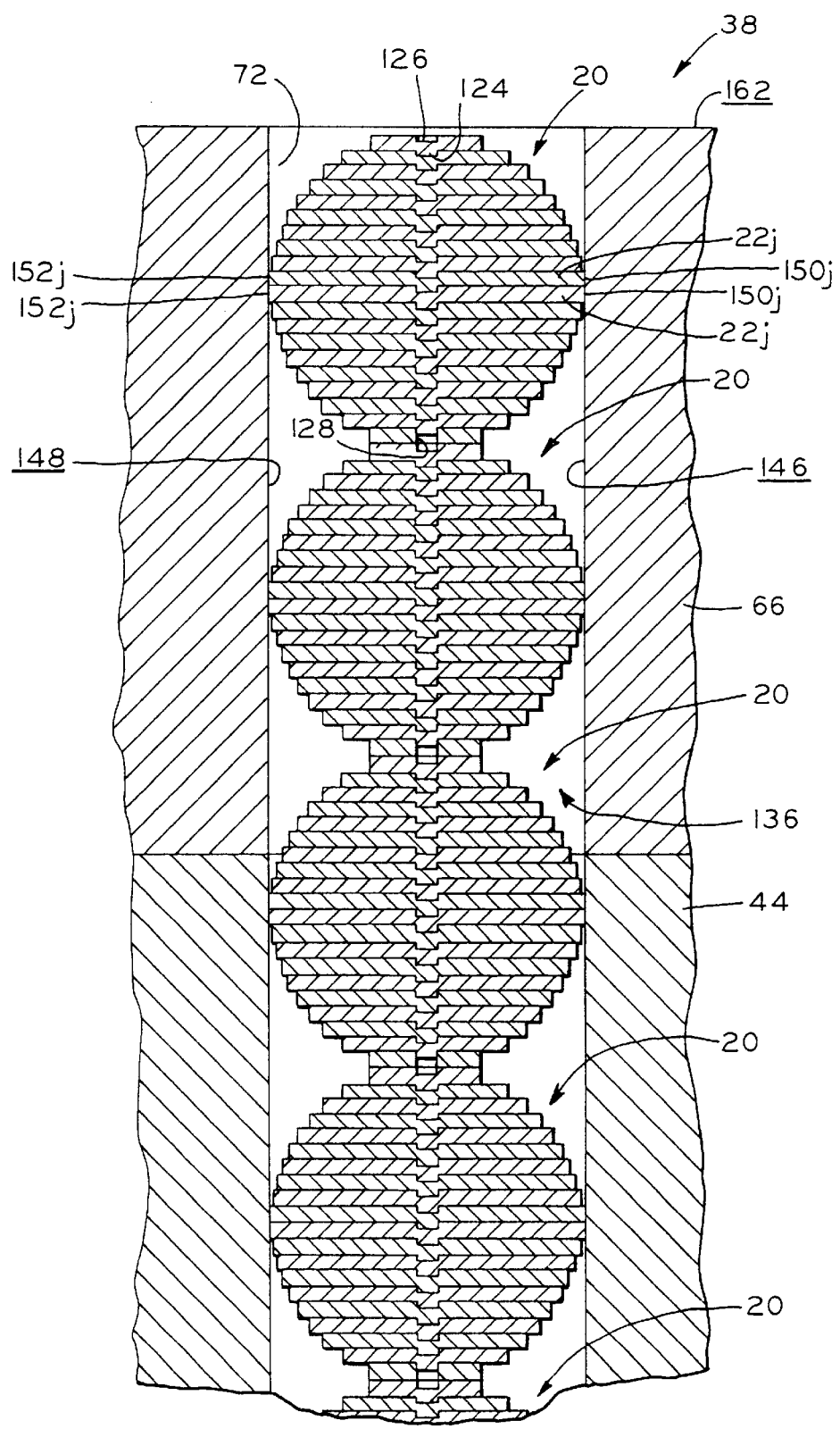
FIG. 10 is a fragmentary sectional end view of the blanking station of FIG. 8, along line 10—10, showing a plurality of stacks of interlocked laminae in the choke passageway thereof.

Notably, it may not be necessary for choke passageway side surfaces 146, 148 to continuously contact side edges 150*j*, 152*j* of widest laminae 22*j*, as shown in FIGS. 9 and 10. Indeed, choke passageway 136 may be provided with downwardly-extending grooves or carbide bar inserts (not shown) which define intermittent side surfaces 146, 148 which contact side edges 150*j*, 152*j* of widest laminae 22*j* only at longitudinally spaced contact areas. Such spaced contact of the choke side walls 146, 148 with edges 150*j*, 152*j* of the widest laminae may be designed to provide part 20 with the proper resistance to movement along choke passageway 136 and to prevent possible buckling, bending or rotation of the stack or individual laminae while in the choke passageway. Further, as seen in FIG. 8, the junctures of side surfaces 146, 148 and end surfaces 142, 144 of choke passageway 136 may be provided with reliefs 158 which extend into side surfaces 146, 148 to ensure that the longitudinal ends of widest laminae 22*j* contact the choke passageway only at their end edges 154, 156, allowing better control of the part's resistance to movement through the choke.

Choke passageway 136 ordinarily contains a plurality of parts 20, and, as will be discussed further hereinbelow, for each part 20 in the choke passageway, the frictional engagement of its end surfaces 32, 34 with respective choke end surfaces 142, 144, and the portions of side edges 150*j*, 152*j* of its widest laminae 22*j* with choke side wall surfaces 146, 148 contribute a portion of the overall frictional resistance which holds the topmost lamina in the choke passageway in place for interlocking with an overlying lamina of the same part. Resistance to downward movement in the choke barrel provides the back pressure necessary to engage the interlock tabs of the laminae when the overlying lamina is pressed into engagement with the remainder of a partially formed stack in choke passageway 136.

Referring to FIG. 9, during the manufacture of the initial part 20, the back pressure otherwise provided by a plurality of completed stacks within choke passageway 136 may be provided by an appropriately numbered plurality of widest laminae 22*j*, which comprise plug 160. Plug 160 is formed by first running apparatus 38 with die station 84 positioned such that its blank portion 126 is disposed over the strip stock material for a number of press cycles appropriate to form plug 160. It is envisioned that the laminae of plug 160 will not be interlocked, and rather will merely abut. Controller 107 may be provided with a special routine which permits widest laminae 22*j* to be run without being provided with interlocking features in forming plug 160. Alternatively, the plug may be a unitary, preformed part (not shown) made of plastic, wood or other suitable material of sufficient circumferential size and thickness that once forced into choke passageway 136, sufficient resistance to movement of the individual laminae and parts 20 is provided for the tabs and slots to interlock. Another alternative would be to provide a hydraulic or pneumatic backpressure device (not shown), such as known in the art, may be used in lieu of plug 160 or the abovementioned unitary, preformed plug to provide resistance to movement of the laminae of the initial stacks until a sufficient plurality of stacks has been accumulated in passageway 136.

Once choke passageway 136 is completely filled with a plurality of parts 20, which provide sufficient frictional engagement with the engaging surfaces of the choke to create sufficient back pressure for interlocking the tabs and slots of the individual parts 20, plug 160 will drop out of the choke passageway, no longer needed. A new plug 160 would be formed the next time the process begins with a clear choke passageway. The number of widest laminae 22*j* in plug 160, the number of parts 20 which are to be contained within passageway 136, the resistance to movement through passageway 136 each part 20 provides, and the resistance necessary to interlock the tabs and slots of the laminae are characteristics which may be varied to suit the particular apparatus and/or the stacks it produces.

To minimize the risk of undesirable bowing, alignment surfaces 142, 144, 146 and 148 of choke passageway 136 utilize a relatively light interference fit which exerts a reduced pressure on each individual lamina but which develops that pressure over a relatively greater vertical depth to thereby provide an adequate total back pressure for engagement of the interlock tabs. For example, in an application wherein a conventional interference fit might involve a 0.001 inch interference fit and a choke depth of 1.25 inches, the present application might utilize a 0.0002 to 0.0005 inch interference fit and a choke depth of 3 inches. Resistance to downward movement within the choke is needed to facilitate the engagement of the interlock tabs of the lamina being blanked with the interlock slots of the uppermost lamina in the choke passageway. The pressure exerted on the individual laminae not only provides resistance to downward motion through the choke passageway, but also helps maintain the laminae in proper alignment.

The process of stacking of one of a plurality of laminae which form a part 20 is sequentially illustrated in FIGS.

11–14, which shows blanking die station 130 at which an individual lamina 22 (here 22c) is severed from strip stock material 108 and automatically stacked within choke passageway 136 during a single die stroke. As described above, the width of all laminae which comprise lamina part 20, except for widest laminae 22j, are established prior those lamina portions reaching the blanking die stations. These laminae are attached to strip stock material 108 at their longitudinal ends, which are severed by blanking punch 164 to form end edges 154, 156 thereon. Each of edges 150j, 152j, 154j and 156j are formed on widest laminae 22j at the blanking die stations.

As noted above, strip stock material 108 includes pilot pin holes 112 which form apertures in the carrier portion of the strip stock material, i.e., that portion of strip stock material which is not used to form laminae. Pilot pin holes 112 are used to maintain the strip stock material in a desired position relative to the die stations as it is stamped during its advancement through the die assembly. As can be seen in FIGS. 11–14, pilot pin 166 passes through pilot pin hole 112 and enters pilot pin bore 64 to properly locate strip stock material 108 and lamina portion 22c attached thereto relative to blanking station 130 prior to stamping the strip stock material. During each stroke of the press(es), ail pilot pins 166 of apparatus 38 engage their respective mating bores 64 through holes 112 in the strip stock material to maintain the material in proper alignment during stamping operations.

FIGS. 11–14 illustrate a portion of upper die portion 54 and die plate 66, the latter of which is attached to lower die portion 44 (FIG. 4). As mentioned above, upper die portion 54 reciprocates vertically, together with pilot pin 166 and blanking punch 164, to stamp the laminae from the strip stock material. Blanking punch 164 severs each lamina portion from the remainder of strip stock material 108 and pushes that lamina into engagement with the uppermost lamina layer disposed in choke passageway 136.

As mentioned above, the scope of the present invention should not be construed as including an apparatus or method which necessarily includes integrally interlocking the individual laminae 22 through tabs 24 and recesses 26 or holes 28, as illustrated. The herein described means for attaching the individual laminae of a part produced in accordance with the present invention is but one way of doing so. Other means in accordance with the present invention for attaching the individual laminae of a part together include, for example, banding, welding, or the use of external fasteners or adhesives. As depicted, however, blanking punch 164 of apparatus 38 includes staking punch inserts 168 which extend below the bottom surface of the blanking punch by a distance designated 170 in FIG. 11. Staking punches 168 correspond to the locations of the interlock tabs and recesses in the lamina portions, and enter recesses 26 of the lamina portion being blanked from strip stock material 108 to positively engage the respective lamina tabs 24 of the lamina being blanked with the respective interlock recesses 26 of the uppermost lamina layer disposed in choke passageway 136, here consisting of lanina 22b.

Staking punch inserts 168 are held in a fixed position relative to blanking punch 164 and each include head 172 which is seated in a counterbore in blanking punch 164. A grind collar (not shown) may be located below head 172 to permit the lowering of staking punch 168 relative to blanking punch 164. Lowering of the staking punch might be necessary due to chipping or wear of staking punch 168 or to accommodate different interlock tab depths. A number of different interlock tab designs are known in the art and the tab design will influence the selection of the appropriate tab depth. In the illustrated embodiment, part 20 utilizes a design in which no portion of interlock tab 24 is completely severed from the surrounding lamina material. Instead, interlock tab 24 is partially blanked from the surrounding material, deforming, but not severing, the material at the edges of interlock tab 24, and extend below the bottom of the remainder of the lamina by approximately ½ to ⅓ the thickness of the lamina layer. As noted above, alternative embodiments of the present invention may employ alternative interlock styles or have the interlock tabs extend a greater or less distance below the remainder of the lamina.

Figure 11:
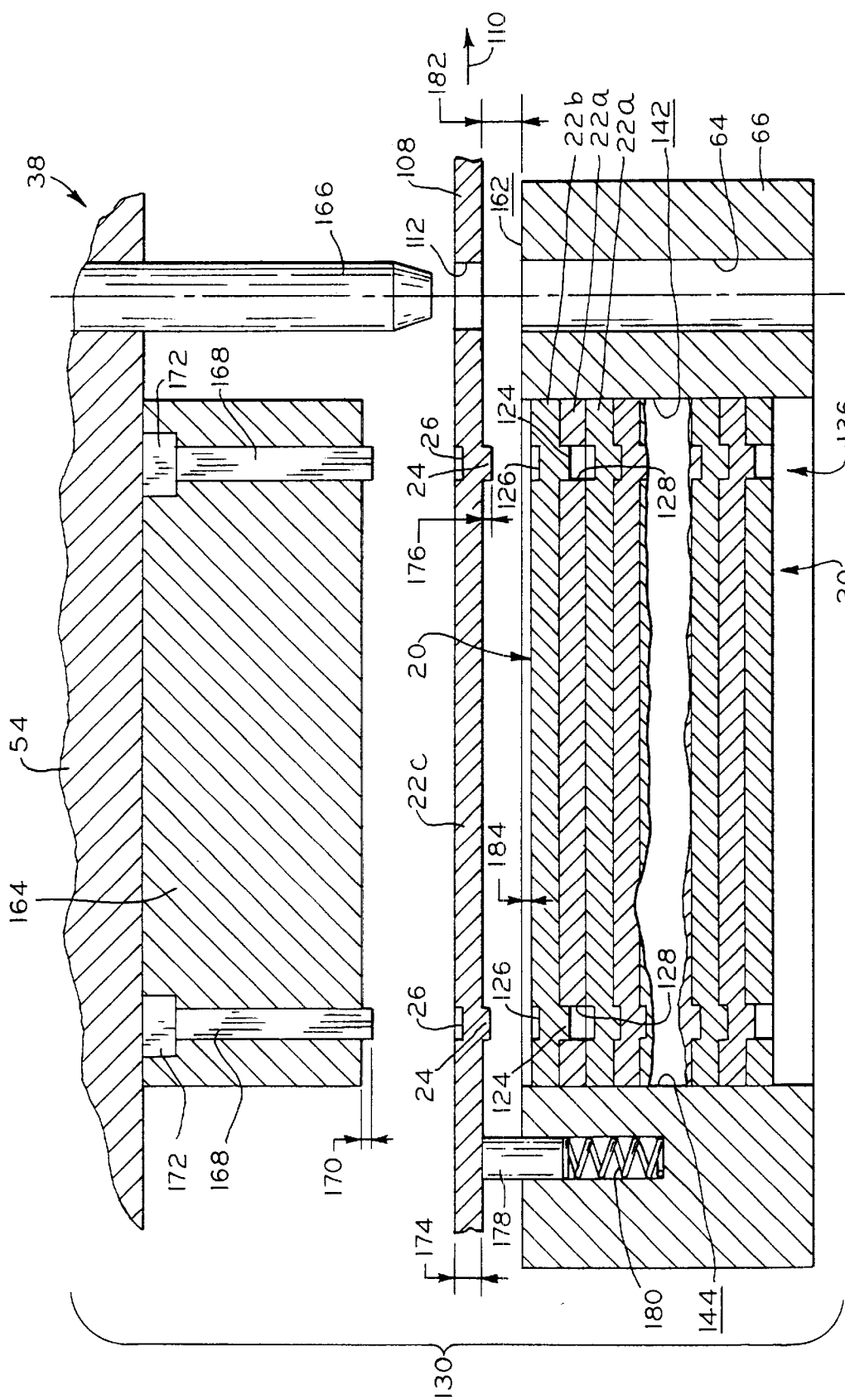
FIG. 11 is a cross sectional view of the die assembly at the blanking station of FIG. 8 along line 11—11, shown at the beginning of a stamping stroke, a completed and a partially completed stack are shown in the choke passageway.

The thickness of the lamina is designated 174 in FIG. 11, and is approximately 0.010 to 0.015 inch, although stacks made according to the present invention may comprise thicker (or thinner) laminae. The distance by which tabs 24 extend below the lower lamina surface is designated 176 in FIG. 11 and is equivalent to the distance 170 by which staking punch 168 extends below blanking punch 164. Because these laminae are rather thin, distance 176 may be equivalent to lamina thickness 174 or even greater to ensure proper engagement of tabs 24 with their mating recesses 26 in the adjacent lamina. The length designations shown in FIG. 11 are included merely to provide a convenient mechanism for graphically identifying the lengths and spatial relationships discussed herein and are not necessarily to scale.

As discussed above, staking punches 168 are used to ensure engagement of interlock tabs 24 into interlock recesses 26 or holes 28, and to prevent tabs 24 from being forced upwardly into the horizontal plane of the remainder of the lamina when tab 24 engages the uppermost lamina in choke passageway 136. Distance 170 which staking punches 168 extend below the bottom surface of blanking punch 164 is equivalent to the depth it is desired to have interlock tabs 24 enter interlock recesses 26 or holes 28 of the lower adjacent lamina, and generally will be equivalent to distance 176 which interlock tabs 24 extends below the lower surface of strip stock material 108 when tabs 24 are formed at die station 68.

Stock lifters 178 are used to prevent tabs 24 from being biased upwardly into the horizontal plane of the strip stock material 108 or from being snagged on die plates 60, 94 or 66 during the progressive movement of strip stock material 108 in the first direction, indicated by arrow 110. Stock lifters 178 are biased upwards by springs 180 and lift strip stock material 108 above upper surface 162 of die plate 66 when the strip stock material is being advanced between die stamping strokes. The strip stock material is lifted by stock lifters 178 a distance designated 182 in FIG. 11. Lifter distance 182 is usually equivalent to approximately 1.5 times the thickness 174 of strip stock material 108, or tab depth 176, whichever is greater, to provide ample clearance. Illustrated stock lifters 178 are cylindrical, but other types of stock lifters, such as bar type lifters, are known in the art and can also be used in apparatus 38.

Figure 12:
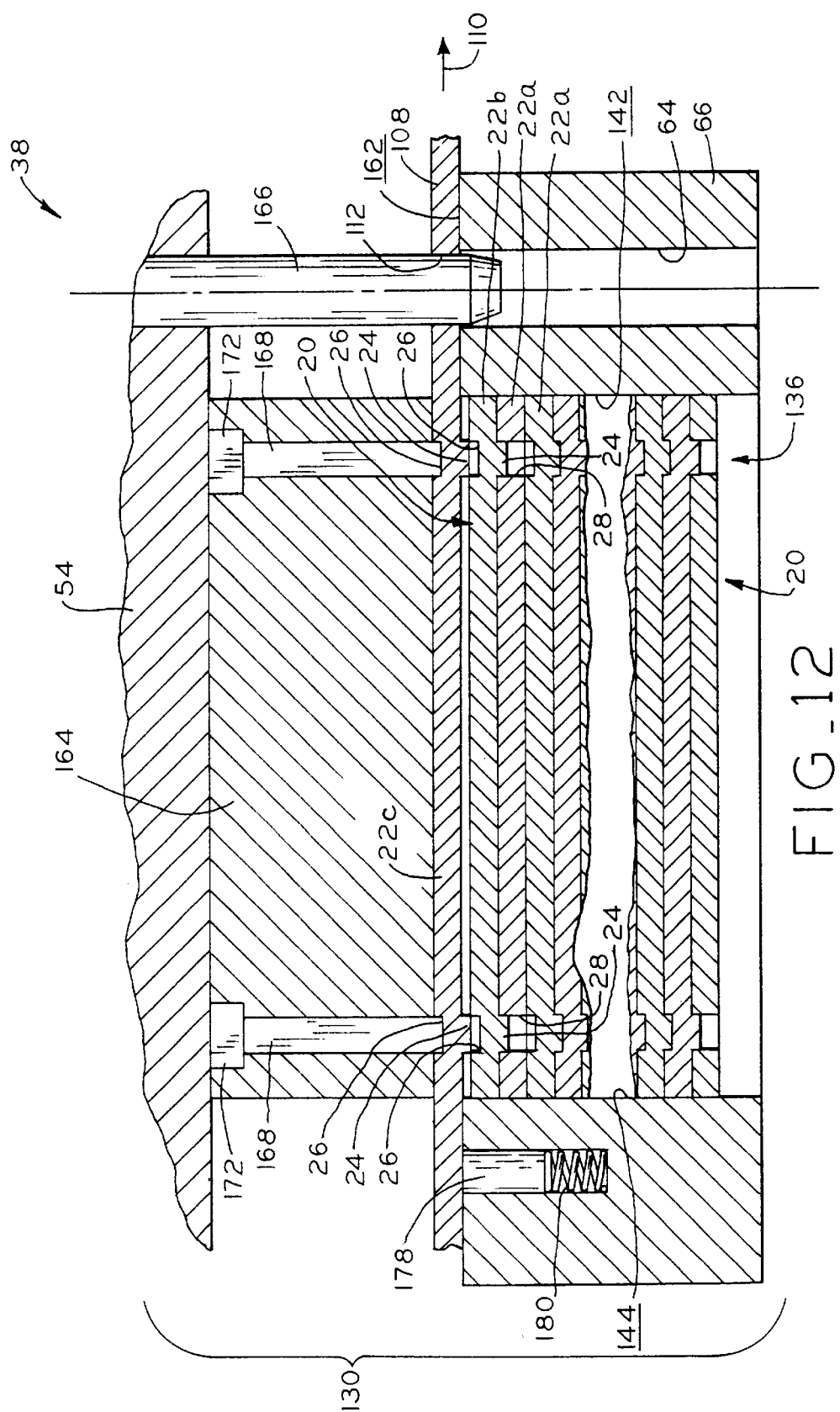
FIG. 12 is a cross sectional view of the die assembly at the blanking station of FIG. 8 along line 12—12, shown after the pilot pin has passed through the pilot hole and entered the pilot bore, a completed and a partially completed stack are shown in the choke passageway.

FIG. 11 illustrates the relative positions of upper die portion 54, punches 164, 168, die plate 66 and strip stock material 108 at the initiation of a stamping stroke at blanking die station 130. FIG. 12 illustrates the die assembly during the downstroke after pilot pin 166 has extended through pilot pin hole 112 and has entered pilot bore 64 to thereby properly locate strip stock material 108 and lamina portion 22c attached thereto. Shortly after pilot pins 166 have properly aligned strip stock material 108, and the lanina portions attached thereto, staking punches 168 enter the recesses 26 of lamina portion 22c, which is about to be blanked. Shortly after staking punches 168 enter recesses 26, blanking punch 164 engages the upper surface of lamina portion 22c.

In FIG. 12, stock lifter spring 180 has been compressed and strip stock material 108 is pressed against upper surface 162 of die plate 66. Strip stock material 108 may be pressed against die plate 66 by engagement with the downwardly moving punches or by another suitable mechanism, such as a spring stripper (not shown), attached to upper die portion 54, which presses the strip stock material against die plate 66 prior to the engagement of punches 164, 168 with the strip stock material.

Figure 13:
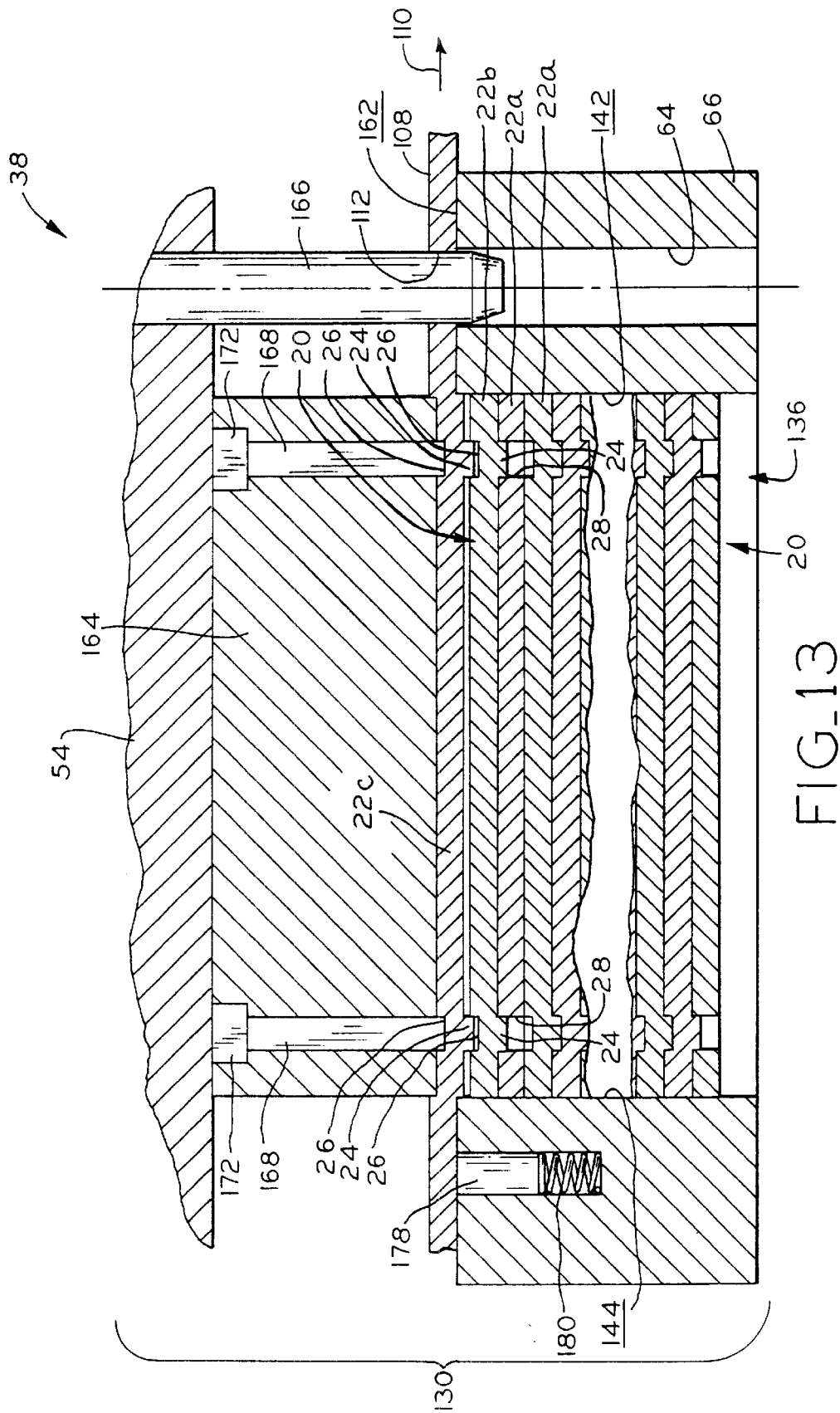
FIG. 13 is a cross sectional view of the die assembly at the blanking station of FIG. 8 along line 13—13, showing interlock tabs of the lamina being blanked being engaged with the uppermost lamina disposed in the choke passageway, a completed and a partially completed stack are shown in the choke passageway.

FIG. 13 illustrates the blanking station after blanking punch 164 has begun to sever lamina portion 22c from the remainder of strip stock material 108. As shown, tabs 24 of lamina portion 22c are already partially engaged with recesses 26 of lamina 22b, the uppermost lamina layer in choke passageway 136. The partial engagement of tabs 24 and recesses 26 occurs prior to the complete separation of lamina portion 22c from the remainder of the strip stock material.

To accomplish the engagement of tabs 24 of lamina portion 22c and recesses 26 of lamina 22b prior to the complete severing of the blanked lamina layer from the strip stock material, the lamina 22b must be positioned in choke passageway 136 near upper surface 162 of die plate 66. Lamina 22b is positioned a distance 184 (FIG. 11) below the entrance of choke passageway 136 located in upper surface 162 of die plate 66.

Figure 14:
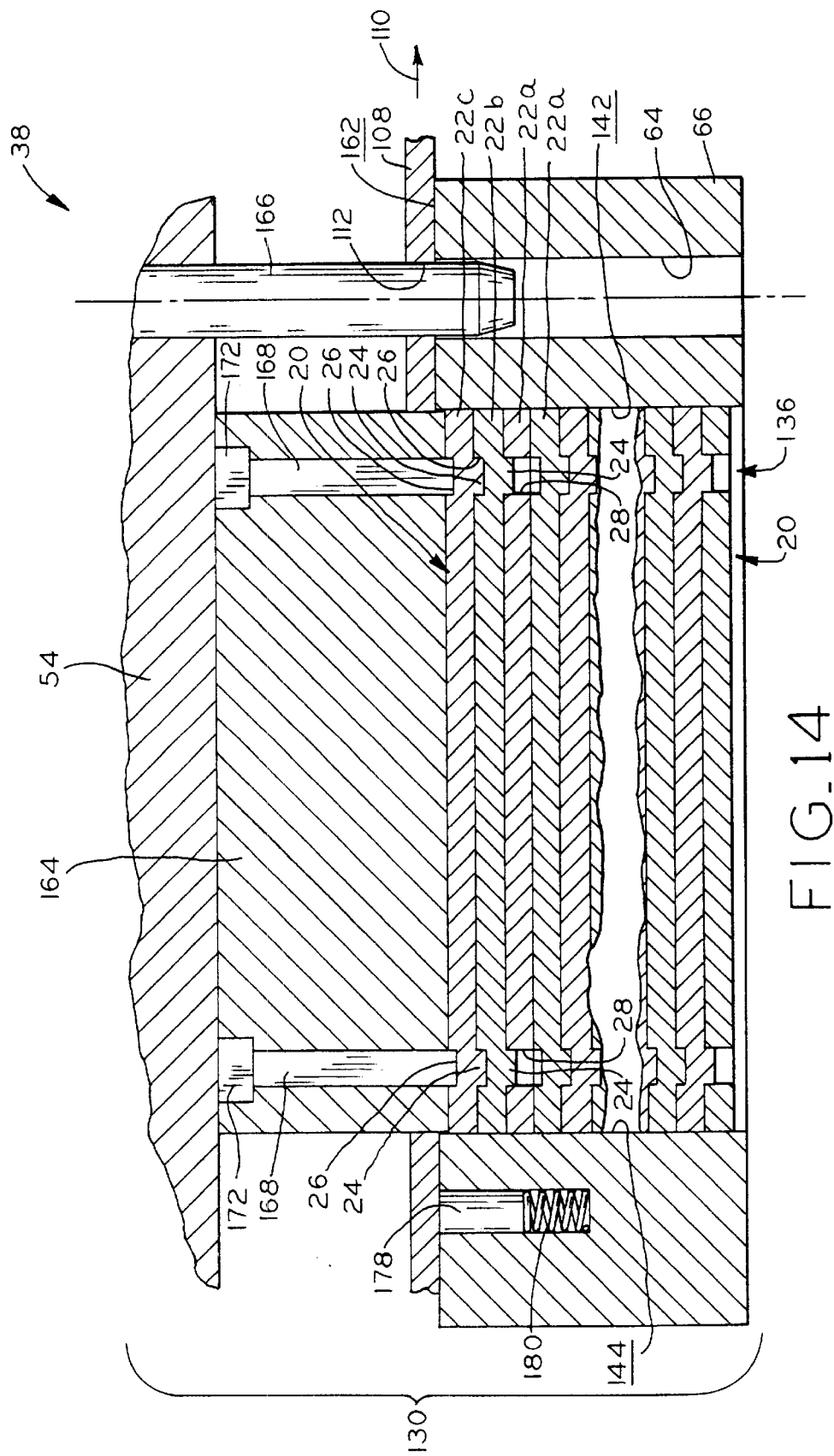
FIG. 14 is a cross sectional view of the die assembly at the blanking station of FIG. 8 along line 14—14, showing the blanking punch separating the lamina from the strip stock material, a completed and a partially completed stack are shown in the choke passageway.

Distance 184 is determined by the distance blanking punch 164 enters choke passageway 136 at the end of the die press downstroke as shown in FIG. 14. Punch entry distance 184 is typically greater than thickness 174 (FIG. 11) of the strip stock material in conventional die assemblies. For example, for a strip stock thickness 174 equivalent to 0.015 inch, a conventional die assembly would often have a punch entry between 0.020 and 0.025 inch.

Referring to FIGS. 11–14, apparatus 38 may, however, utilize a much smaller punch entry which ensures that interlock tabs 24 of a second, blanked lamina (e.g., 22c) are engaged with recesses 26 of a first, lamina (e.g., 22b) which is already in the choke passageway prior to completely severing second lamina 22b from the remainder of strip stock material 108. For example, by utilizing a distance 184 which is smaller than tab depth distance 176 (FIG. 11), tabs 24 will be partially interlocked with recesses 26 when the die assembly reaches the position shown in FIG. 12. Alternatively, distance 184 can be equivalent to distance 170 (as shown in FIGS. 11–14) and tabs 24 will be engaged with recesses 26 or holes 28 as the lamina portion being blanked is being severed from the strip stock material, but prior to their complete separation. It may also be possible to have a distance 184 slightly larger than distance 170 and still provide for the partial interlocking of tabs 24 and recesses 26 prior to complete separation of a lamina portion from the strip stock material. The partial interlocking in such an arrangement, however, would be minimal.

It is to be understood that in practicing the present invention, partial interlocking of a first lamina already disposed in the choke and a second lamina not yet completely severed from the strip stock material is not necessary in all cases. Notably, with reference to FIGS. 1 and 8, the notches in each lamina, which collectively form grooves 36, 37 in respective surfaces 32, 34 of a part 20, slidably engage protrusions 138, 140 of the choke passageway. This engagement prevents lateral movement of an individual lamina, or an interlocked stack of laminae, in the choke. Further, the sliding engagement of lamina edges 154, 156 or of part surfaces 32, 34 with adjacent choke surfaces 142, 144, maintain the longitudinal position of the individual lamina, or stack of laminae, in the choke. Because the lateral and longitudinal movement of each lamina or stack of laminae are so restrained, there is no need, in the case of part 20, to partially engage the interlocking features of the first and second laminae prior to severing the second lamina from the strip stock material as described immediately above.

Blanking punch 164 severs the longitudinal ends of lamina portion 22c from the remainder of strip stock material 108 in cooperation with cutting edges on die hole opening 172, forming end edges i 54, 156 thereon. Typically, after blanking punch 164 has sheared the lamina portion to a depth which is approximately ⅓ of the lamina thickness, the lower ⅔ of the strip stock material will fracture and the lamina portion will be completely separated from the strip stock material. The use of a softer, more elastic strip stock material, however, would permit the blanking punch to enter the strip stock material for more than ⅓ of the lamina thickness and produce a lamina with a smaller fracture zone.

Referring to FIG. 14, the downstroke is finished by pushing lamina portion 22c into further engagement with uppermost lamina 22b in choke passageway 136 and pushing lamina 22c to a depth 184 (FIG. 11) below upper surface 162 of die plate 66. After blanking punch 164 is retracted, stock lifters 178 elevate strip stock material 108, which then proceeds in the direction indicated by arrow 110. The blanking cycle is repeated with lamina portion 22d next added to the part 20 being assembled in choke passageway 136.

It is envisioned that the choke passageway may be provided with a side surface (such as surface 146 or 148) which is spring loaded to accommodate a slight growth in part width resulting from wear to the die cutting edges, for it is expected that as the cutting edges dull slightly, the resultant width of laminae 22j may begin to grow. This lamina width change, while slight, could alter the behavior of the stacks in the choke. It is expected that allowing the choke passageway to so expand against the force of a spring (not shown) would help compensate for changes in lamina size as a result of tool wear. Additionally, as mentioned above, single controller 107, or the second controller of the above-described alternative control means, may control the pressure exerted on the stacks in each choke passageway having such spring loaded side surfaces, as well as an unload device operatively communicating with each of the choke passageways.

Referring to FIGS. 15A and 15B, respectively, choke passageway 136a is that associated with blanking die station 130 (FIG. 6B), and choke passageway 136b is that associated with blanking die station 132 (FIG. 6B). As shown in FIG. 15A, backpressure device 190a comprises first, horizontally actuating pneumatic or hydraulic/pneumatic cylinder 192a having either "high" or "low" pressure fluid controllably applied thereto, in coordination with the press cycle. During "up" cycles of the press, as the ram begins its ascent from the bottom of its stroke and the blanking die begins to ascend from the uppermost lamina in the choke passageway, high pressure is applied to cylinder 192a to ensure that stacks 20 in choke passageway 136a are securely clamped between fixed choke sidewall surface 146a and moveable choke sidewall surface 148a, which is biased towards the fixed sidewall surface by compression springs 194. Notably, surface 148a may be defined by separate, upper and lower choke sidewall portions 196a, 198a, respectively, only one of which (as shown, lower portion 198a) is engaged with cylinder 192a. With reference to FIG. 15B, backpressure device 190b and choke passageway 136b each have a respectively similar structure and operation to device 190a and passageway 136b, and are correspondingly marked. Notably, cylinders 192a and 192b may be cycled independently, but because blanking die stations 130 and 132 cycle simultaneously in the depicted embodiment, the cylinders are simultaneously actuated, and may be commonly linked to the controller.

In addition to the above, controlled backpressure variation, immediately below each choke passageway 136 may be provided second, vertically actuated pneumatic or hydraulic/pneumatic cylinder 200a or 200b, which is positioned to strike support anvil 202a or 202b. Anvils 202 move downward as the number of laminae in the choke passageway incrementally increases as a new stack 20 is formed. Cylinders 200 also have either "high" or "low" pressure fluid controllably applied thereto, in coordination with the press cycle. Each anvil 202 is lightly biased upwardly under the influence of a spring (not shown) to keep it in contact with the lowermost stack 20 in the choke passageway. Cylinder 200 and anvil 202 provide a means for "restriking" the bottommost stack 20 in the choke passageway, and ensure that its laminae are completely abuttingly engaged and are fully interlocked.

During "up" cycles of the press, after high pressure has been applied to first cylinders 192, high pressure is applied to cylinders 200 which strike anvils 202 to compress the lowermost stack 20 in the choke passageway. After anvils 202 are struck, the pressure in second cylinders 200 is immediately relieved (i.e., it reverts to low pressure); the pressure in cylinders 192 is then also relieved. Those skilled in the art will appreciate that first and second cylinders 192 and 200 may cycle once per cycle, once per stack (e.g., 20 cycles), or as often as desired. The pressurization of first cylinder 192 will prevent stacks from being driven upwards in the choke during the restriking as second cylinder 200 impacts anvil 202. Because first cylinder 192 can be pressurized at any time between the time that the punch ram reaches its bottommost position and the time that the blanking punch next comes into contact with the strip stock, the opportunity for accomplishing the restrike extends over much of the press crank rotation. The number of restrikes the stacks undergo may be varied by the operator by adjustment to the controller. Those skilled in the art will appreciate that the restriking is performed while the press is in its open, rather than its closed position. The actuation of first cylinder 192 during restriking, to firmly clamp the stacks 20 in the choke passageway, prevents the upward movement of the stacks in the choke.

Previous backpressure and restriking methods may employ a single, vertically oriented cylinder, and are done in the closed die position. These methods rely on the downwardly moving blanking punch to effect the restrike as well as sever the material from the strip stock and at least partially engage the interlocking tabs and recesses. The prior methods require a relatively high pressure on the vertically oriented cylinder, the vertical position of which is controlled with a check valve so that it resists the downward movement of the stacks in the choke passageway, but once overcome and driven downward by the force of the press, holds its new vertical position. If this cylinder is not properly controlled, it will tend to push the stacks back up the choke passageway, which can be very dangerous. The control of such previous cylinders is further complicated when this cylinder is also used as a part unloader device for ejecting the part from the choke.

In accordance with the present invention, once a new, completed stack 20 has been formed in the choke passageway, a third pneumatic or hydraulic/pneumatic cylinder (not shown) may be provided which is actuated as the pressure in second cylinder 200 is relieved, to axially eject the bottommost stack 20 from the choke with greater ease of control vis-a-vis previous part ejectors. Proximity switches (not shown) may be used to sense the vertical positions of anvils 202, and when these switches indicate that another stack 20 has been completed within the choke, the third cylinder is actuated. Once the bottommost stack has been ejected, the anvil moves upward under the influence of its biasing spring into contact with the new bottommost stack in the choke. The actuation of the third cylinder, like those of the first and second cylinders, is controlled by single controller 107 or the second controller of the above-described alternative control means.

Figure 15C:
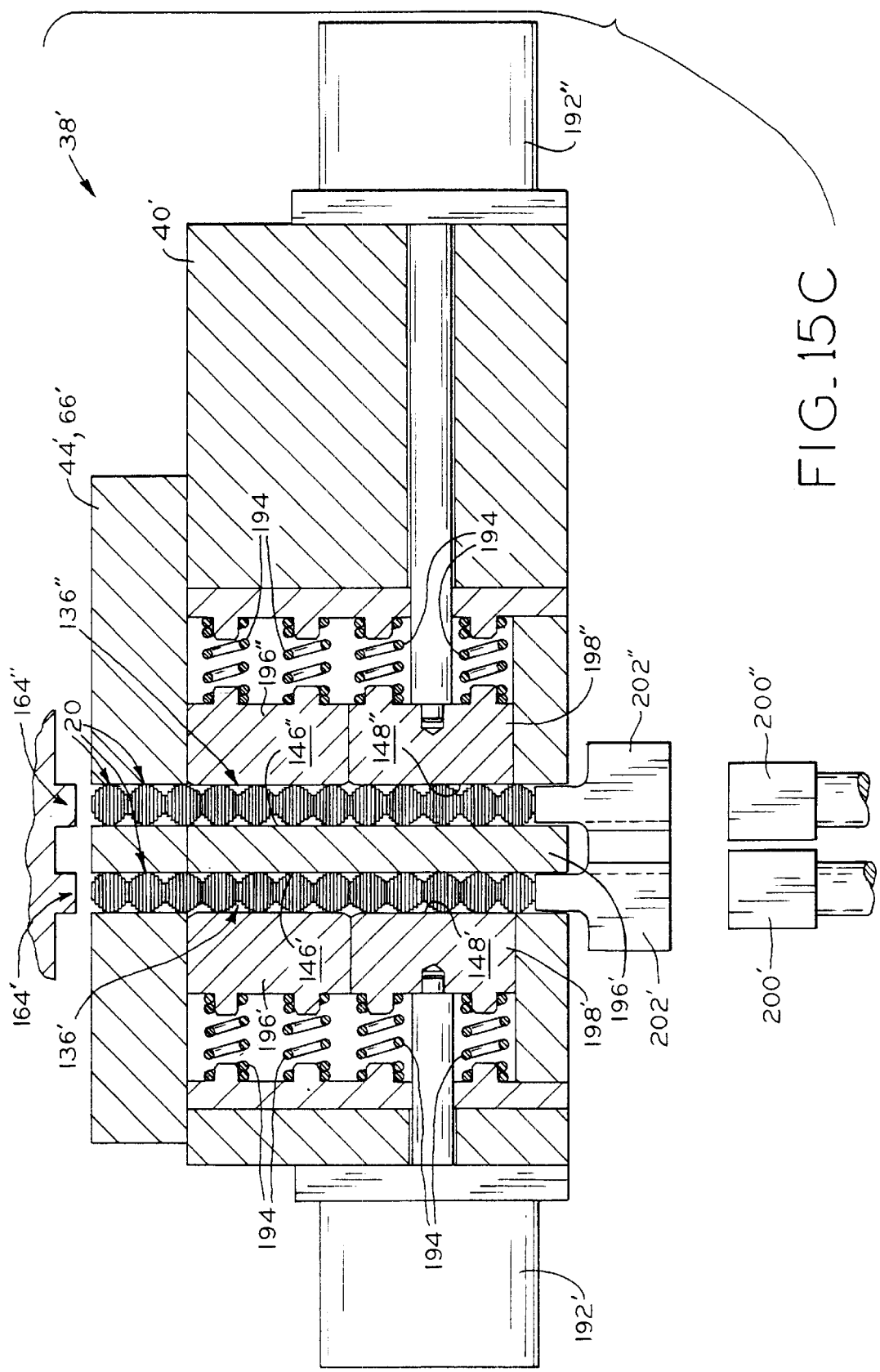
FIG. 15C is a cross sectional view of an alternative die assembly to that shown in FIG. 6B, showing a second embodiment of an alternative die apparatus having two laterally aligned choke passageways.

FIG. 15C illustrates a further alternative structure to those shown in FIGS. 15A and 15B. Rather than being configured as shown in FIG. 6B, in this second alternative embodiment, two choke passageways 136', 136" are located laterally adjacent (i.e., perpendicular to first direction 110) in die plate 66'. Moveable choke sidewall surfaces 148', 148" are respectively biased by springs 194 towards fixed choke sidewall surfaces 146', 146", which are located on opposite sides of a common portion of lower die portion 44' located between the two choke passageways. In the manner described above, first, horizontally actuated cylinders 192', 192" operatively engage lower choke sidewall portions 198', 198", and second, vertically actuated cylinders 200', 200" impact anvils 202', 202". It is envisioned that a single second cylinder and a single, two-headed anvil may be employed in the depicted embodiment.

Those skilled in the art will recognize that the above-described methods and apparatus may be combined to produce elongate stacks having cross sectional shapes having side surfaces formed by lamina side edges which do not engage choke passageway and in which the lamina layers are comprised of a plurality of discrete lamina segments, each segment provided with interlocking means as described herein above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing a stack of laminae in a progressive stamping die assembly having means for guiding strip stock material through the die assembly in a first direction, a transversely moveable die station which is moveable in opposite second and third directions substantially perpendicular to the first direction and having a plurality of predetermined positions, and a choke passageway, said method comprising:

stamping a first lamina having a first shape in the strip stock material in the transversely moveable die station while the transversely moveable die station is in a first predetermined position;

substantially simultaneously advancing the strip stock material through the die assembly in the first direction and moving the transversely moveable die station in one of the second and third directions to a second predetermined position;

stamping a second lamina having a second shape in the strip stock material in the transversely moveable die station while the transversely moveable die station is in the second predetermined position, the second shape different than the first shape;

separating the first lamina from the strip stock material;

placing the first lamina into the choke passageway;

separating the second lamina from the strip stock material subsequently to placing the first lamina into the choke passageway;

placing the second lamina into the choke passageway; and frictionally engaging the choke passageway with at least one of the first and second laminae.

2. The method of claim 1, further comprising substantially aligning the first and second laminae along the first direction prior to separating the second lamina from the strip stock material.

3. The method of claim 1, further comprising:

stamping at least one first interlock element into the first lamina;

stamping at least one second interlock element into the second lamina; and at least partially engaging the first and second interlock elements subsequently to placing the first lamina into the choke passageway.

4. The method of claim 1, wherein the first and second laminae are elongate and have generally opposed first and second longitudinally extending edges formed in the moveable die station.

5. The method of claim 1, further comprising providing the die assembly with a blanking die station located in the first direction relative to the transversely moveable die station and having a cyclically moving blanking punch and a mating stationary blanking die hole, and further comprising engaging the blanking punch and blanking die hole, and individually separating the first and second laminae from the strip stock material and placing the first and second laminae into the choke passageway at the blanking die station in response to engagement of the blanking punch and blanking die hole.

6. The method of claim 5, wherein the laminae enter the choke passageway through the blanking die hole.

7. The method of claim 5, further comprising separating a lamina from the strip stock material and placing that lamina into the choke passageway during a single cycle of the blanking punch.

8. The method of claim 5, further comprising substantially simultaneously separating a lamina from the strip stock and placing that lamina into the choke passageway.

9. The method of claim 5, further comprising:

forming, in the first transversely moveable die station position, first and second generally opposed edges in the first lamina;

forming, in the second transversely moveable die station position, first and second generally opposed edges in the second lamina; and forming third and fourth generally opposed edges in each of the first and second laminae at the blanking die station;

wherein at least one of the first and second edges of the first lamina is not in alignment with either of the first and second edges of the second lamina when the first and second laminae are both in the choke passageway, and wherein the third and fourth edges of the first lamina are in alignment with the respective third and fourth edges of the second lamina when the first and second laminae are both in the choke passageway.

10. The method of claim 9, further comprising frictionally engaging the first and second edges of one of the first and second laminae with the choke passageway.

11. The method of claim 9, further comprising slidably engaging the third and fourth edges of both the first and second laminae with the choke passageway.

12. The method of claim 9, further comprising forming in at least one of the third and fourth edges of each lamina a first one of a notch and a protrusion, providing a surface of the choke passageway adjacent that lamina edge with a second one of a protrusion and a notch which extends along the choke passageway, and slidably receiving the protrusion of one of the choke surface and the lamina edge in the notch of the other of the choke surface and the lamina edge, whereby that lamina edge is restrained from lateral movement relative to the adjacent choke passageway surface.

13. The method of claim 12, further comprising forming in each of the third and fourth edges of each lamina a first one of a notch and a protrusion, providing the surfaces adjacent the third and fourth lamina edges with a second one of a protrusion and a notch, and slidably receiving the protrusions of one of the choke surfaces and the lamina edges in the notch of the other of the choke surfaces and the lamina edges, whereby the lamina is restrained from lateral movement relative to the choke passageway.

14. The method of claim 1, further comprising providing the transversely moveable die station with a plurality of matched punch and die hole sets, and engaging each of the individual matched punch and die hole sets with the strip stock material at selectively different transversely movable die station positions.

15. The method of claim 14, further comprising substantially simultaneously cycling all punches of the transversely moveable die station.

16. The method of claim 14, further comprising substantially simultaneously cycling the punch of the matched punch and die hole set which engages the strip stock material at the transversely movable die station and a blanking punch, and separating a lamina from the strip stock material and placing that lamina into the choke passageway with the blanking punch.

17. The method of claim 14, further comprising providing the transversely moveable die station with an idle position in which no material is stamped from the strip stock material located in the transversely moveable die station.

18. The method of claim 17, further comprising passing a lamina through the transversely moveable die station when the transversely moveable die station is at its idle position, and forming generally opposed first and second edges in that lamina at the blanking die station.

19. The method of claim 18, further comprising frictionally engaging the opposed first and second edges formed in the lamina at the blanking die station with the choke passageway.

* * * * *